(12) United States Patent
Mitsugi et al.

(10) Patent No.: US 12,265,651 B2
(45) Date of Patent: Apr. 1, 2025

(54) INFORMATION PROCESSING DEVICE AND CONTROL METHOD OF INFORMATION PROCESSING DEVICE

(71) Applicant: Panasonic Intellectual Property Management Co., Ltd., Osaka (JP)

(72) Inventors: Tomonori Mitsugi, Tokyo (JP); Yoshiharu Imamoto, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 218 days.

(21) Appl. No.: 18/104,996

(22) Filed: Feb. 2, 2023

(65) Prior Publication Data

US 2023/0306137 A1 Sep. 28, 2023

(30) Foreign Application Priority Data

Mar. 28, 2022 (JP) ................. 2022-051601

(51) Int. Cl.
*G06F 21/62* (2013.01)
*G06F 21/12* (2013.01)

(52) U.S. Cl.
CPC ........ *G06F 21/6281* (2013.01); *G06F 21/121* (2013.01); *G06F 2221/2141* (2013.01)

(58) Field of Classification Search
CPC .............. G06F 21/6281; G06F 21/121; G06F 2221/2141
USPC ........................................................ 726/27
See application file for complete search history.

(56) References Cited

U.S. PATENT DOCUMENTS

| | | | | |
|---|---|---|---|---|
| 7,143,261 B2* | 11/2006 | Maeda | ................. | G06F 3/0613 711/170 |
| 7,720,483 B2* | 5/2010 | Kim | ...................... | H04L 5/0039 455/450 |
| 8,151,040 B2* | 4/2012 | Wong | .................. | G06F 12/0246 711/E12.008 |
| 8,200,889 B2* | 6/2012 | Kwon | ................. | G06F 12/0246 711/170 |
| 8,565,233 B2* | 10/2013 | Song | ..................... | H04W 72/30 455/518 |
| 9,038,168 B2* | 5/2015 | Ben-Zvi | .............. | G06F 21/6218 713/182 |
| 10,049,216 B2* | 8/2018 | Rothman | .............. | G06F 21/604 |
| 10,764,909 B2* | 9/2020 | Calcev | .................. | H04L 1/0002 |
| 2001/0025311 A1 | 9/2001 | Arai et al. | | |

(Continued)

FOREIGN PATENT DOCUMENTS

JP 4177957 B2 11/2008

*Primary Examiner* — Amare F Tabor
(74) *Attorney, Agent, or Firm* — GREENBLUM & BERNSTEIN, P.L.C.

(57) ABSTRACT

An information processing device includes a guest OS and a host OS that accesses a sector group in response to an access request from the guest OS. The host OS includes: an access log analyzer that generates, by reference to a sector-group database, a sector-group access log from the access request; a sector-group access determiner that determines, based on the sector-group access log, whether the access request seeks to access the sector group related to an application; and a manager that updates, based on a developer definition policy, a sector-group access rule database and the sector-group database if it is determined that the access request seeks to access the sector group and the guest OS makes a change to an application storage area.

8 Claims, 26 Drawing Sheets

(56) References Cited

U.S. PATENT DOCUMENTS

| | | | |
|---|---|---|---|
| 2005/0278543 A1* | 12/2005 | Tsuda | G06F 21/6281 |
| | | | 713/182 |
| 2009/0172289 A1* | 7/2009 | Yamamura | G06F 12/127 |
| | | | 711/128 |
| 2013/0086307 A1* | 4/2013 | Kurashige | G06F 3/0659 |
| | | | 711/E12.019 |
| 2014/0071847 A1* | 3/2014 | Pantelidou | H04L 5/0069 |
| | | | 370/252 |
| 2015/0220737 A1* | 8/2015 | Rothman | G06F 21/572 |
| | | | 726/1 |

* cited by examiner

FIG. 2

| Timestamp | Operation target VM | Operation type | Sector number | Payload |
|---|---|---|---|---|
| 9/3/2021 18:39:01.032 | 1 | read | 1111 | e38182efbd93efbd84e381b5e38181efbd93efbd84 |
| 9/3/2021 18:39:01.421 | 1 | read | 1111 | 81b5e38181efbd93efbd84efbd86e3819 |
| 9/3/2021 18:39:02.251 | 2 | read | 6243 | 81efbd93efbd84e381b5e3 |
| 9/3/2021 18:39:04.381 | 1 | write | 2223 | d84e381b5e38181efbd93efbd84e381b5e381 |
| 9/3/2021 18:39:05.723 | 1 | write | 4444 | 93efbd84efbd86e381b5e38181efbd93e |

| Sector group name | Sector number |
|---|---|
| /home/key/secret.dat | 1111 |
| /var/log/system.log | 2222 |
| /var/log/system.log | 2223 |
| /var/log/ | 4444 |

FIG. 4

| Timestamp | Operation type | Sector number | Sector group name | Payload |
|---|---|---|---|---|
| 9/3/2021 18:39:01.032 | read | 1111 | /home/key/secret.dat | e38182efbd93efbd84e381b5e38181efbd93efbd84 |
| 9/3/2021 18:39:01.421 | read | 1111 | /home/key/secret.dat | 81b5e38181efbd93efbd84efbd86e3819 |
| 9/3/2021 18:39:04.381 | write | 2223 | /var/log/system.log | d84e381b5e38181efbd93efbd84e381b5e381 |
| 9/3/2021 18:39:05.723 | write | 4444 | /var/log/ | 93efbd84efbd86e381b5e38181efbd93e |

| Sector group name | Latest access date and time | Latest accessing process | Latest operation | Last sector number |
|---|---|---|---|---|
| /var/log/system.log | 9/17/2021 04:43:21.213 | systemlogd | write | 1234 |
| /home/key/secret.dat | 8/1/2021 03:04:12.123 | updateservice | read | 1111 |
| /var/log/ | 9/18/2021 05:53:32.142 | find | read | 4444 |

| Sector group name | Access-authorized process | Access-authorized operation | Sector group type |
|---|---|---|---|
| /home/key/secret.dat | updateservice | read | Personal information |
| /var/log/system.log | loggerd | read, write | Log |
| /var/log/ | — | read, write | i-node |

FIG. 8

| Application name | Monitoring-protection target sector group name | Sector attribute | Latest update date and time |
|---|---|---|---|
| navigation | /app/navigation.app | Application body | 9/10/2021 16:44:01.022 |
| | /app/navigation/MovementHistory | Application component | 9/10/2021 16:44:01.031 |
| | /app/navigation/DevPolicy | Developer definition policy | 9/10/2021 16:44:02.011 |
| MusicStore | /app/MusicStore.app | Application body | 9/20/2021 12:31:05.721 |
| | /app/MusicStore/music | Application component | 9/20/2021 12:31:06.012 |
| | /app/MusicStore/DevPolicy | Developer definition policy | 9/20/2021 12:31:06.032 |
| CouponStorage | /app/CouponStorage.app | Application body | 9/25/2021 14:25:04.381 |
| | /app/CouponStorage/shop | Application component | 9/25/2021 14:25:04.042 |
| | /app/CouponStorage/station | Application component | 9/25/2021 14:25:04.055 |
| | /app/CouponStorage/DevPolicy | Developer definition policy | 9/25/2021 14:25:04.067 |

FIG. 9

| Storage destination directory ID | Sector group name | Access-authorized process | Access-authorized operation | Type |
|---|---|---|---|---|
| 1 | CouponStorage.app | user | read | Body |
| 1 | prof | | read, write | Personal information |
| 1 | purchasehistory | user | read | Personal information |
| 2 | shop | payment | read | Application component data |
| 2 | station | payment | read | Application component data |

| Directory ID | Directory creation location | Directory name | Access-authorized operation | Type |
|---|---|---|---|---|
| 1 | Application storage area | /CouponStorage | read, write | Body storage destination |
| 2 | Application-related file storage area | /CouponStorage | read, write | Application-related data |

| Sector group name | Access-authorized process | Access-authorized operation | Sector group type |
|---|---|---|---|
| /app/browser | | read, write | Personal information |
| /app/mailer | | read, write | Personal information |
| /app/CouponStorage.app | user | read | Personal information |
| /opt/CouponStorage/shop | Felica | read | Application component data |

(b)

| Sector group name | Access-authorized process | Access-authorized operation | Sector group type |
|---|---|---|---|
| /app/browser | | read, write | Personal information |
| /app/mailer | | read, write | Personal information |
| /app/CouponStorage.app | user | read | Personal information |
| /opt/CouponStorage/shop | Felica | read | Application component data |
| /opt/CouponStorage/station | Felica | read | Application component data |

INFORMATION PROCESSING DEVICE AND CONTROL METHOD OF INFORMATION PROCESSING DEVICE

CROSS REFERENCE TO RELATED APPLICATION

The present application is based on and claims priority of Japanese Patent Application No. 2022-051601 filed on Mar. 28, 2022.

FIELD

The present disclosure relates to an information processing device and a control method performed by the information processing device.

BACKGROUND

A known information processing device includes: a service operating system (hereinafter, referred to as a "service OS"); a security operating system (hereinafter, referred to as a "security OS"); and a control program for controlling execution of the service OS and the security OS (see Patent Literature (PTL) 1, for example).

The service OS hooks (obtains) an access request to access a file on a magnetic disk from a server program, and requests the security OS to determine the validity of the hooked access request. Based on a rule specified for each file, the security OS determines whether the access request from the server program is unauthorized. If the security OS determines that the access request from the server program is unauthorized, the service OS generates an error code based on the result of the determination from the security OS.

In contrast, if the security OS determines that the access request from the server program is not unauthorized, the service OS accesses the file on the magnetic disk in response to the access request from the server program, based on the result of the determination from the security OS.

CITATION LIST

Patent Literature

PTL 1: Japanese Patent No. 4177957

SUMMARY

However, the above-described conventional information processing device can be improved upon.

In view of this, the present disclosure provides an information processing device and a control method performed by the information processing device that are capable of improving upon the above related art.

An information processing device according to an aspect of the present disclosure includes: an operating system that includes an application storage area for storing an application, and executes the application; and a control system that accesses a sector group stored in a storage device, in response to an access request from the operating system, wherein the control system includes: an analyzer that, by reference to correspondence information indicating a correspondence between a sector number and a sector group identifier of the sector group stored in a storage area corresponding to the sector number in the storage device, generates access data from the access request by associating the sector number included in the access request with the sector group identifier; a monitor that determines whether the access request is unauthorized, based on the access data and rule information indicating a rule for accessing the sector group stored in the storage device; a determiner that determines, based on the access data, whether the access request seeks to access the sector group related to the application stored in the storage device; and a manager that, if it is determined that the access request seeks to access the sector group related to the application and the operating system makes a change to the application storage area, obtains application information related to the application and updates, based on the application information obtained, the rule information and the correspondence information.

It should be noted that these generic or specific aspects may be implemented as a system, a method, an integrated circuit, a computer program, or a computer-readable recording medium such as a compact disc-read only memory (CD-ROM), or may be implemented as any combination of a system, a method, an integrated circuit, a computer program, and a recording medium.

An information processing device, or the like, according to an aspect of the present disclosure is capable of improving upon the related art.

BRIEF DESCRIPTION OF DRAWINGS

FIG. 2 illustrates an example of a device access log according to Embodiment.

FIG. 3 illustrates an example of a sector-group database according to Embodiment.

FIG. 4 illustrates an example of a sector-group access log according to Embodiment.

FIG. 5 illustrates an example of sector-group access information according to Embodiment.

FIG. 6 illustrates an example of a sector-group access rule database according to Embodiment.

FIG. 8 illustrates an example of an application database according to Embodiment.

FIG. 9 illustrates an example of a developer definition policy according to Embodiment.

FIG. 10 illustrates an example of a directory generation destination policy according to Embodiment.

FIG. 25 illustrates an example of before and after updating of the sector-group access rule database when the guest OS updates the application.

Figure 1:
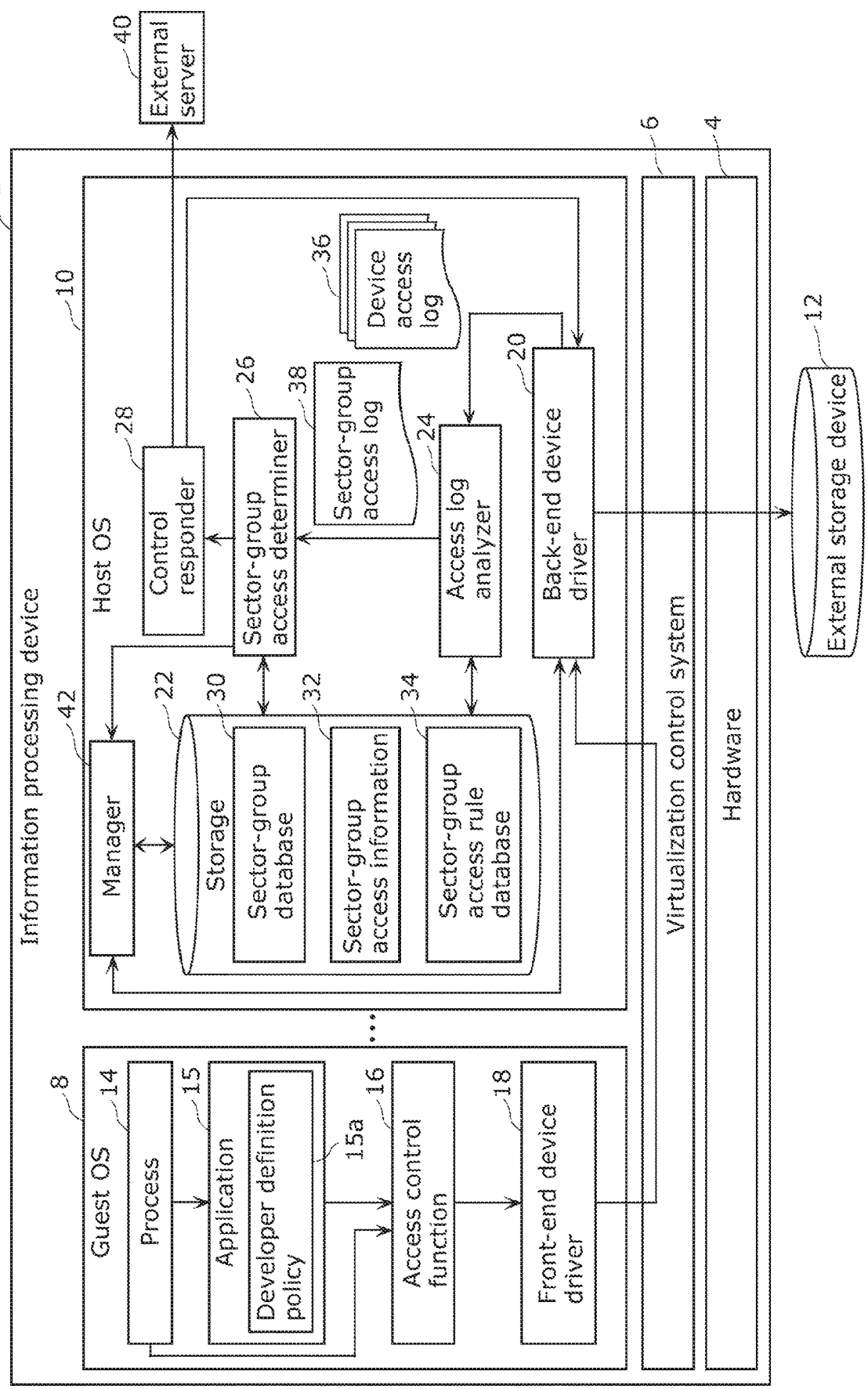
FIG. 1 is a block diagram illustrating a configuration of an information processing device according to Embodiment.

DESCRIPTION OF EMBODIMENTS (Underlying Knowledge Forming Basis of the Present Disclosure)

The inventors found that the subsequent problem arises in the technique described in the "Background" section.

In the above-described conventional information processing device, there is the problem that, when a new application is added to the service OS, the security OS has no rule for protecting a file related to this application and thus the validity of an access request cannot be accurately determined.

In order to solve such a problem, an information processing device according to an aspect of the present disclosure includes: an operating system that includes an application storage area for storing an application, and executes the application; and a control system that accesses a sector group stored in a storage device, in response to an access request from the operating system. The control system includes: an analyzer that, by reference to correspondence information indicating a correspondence between a sector number and a sector group identifier of the sector group stored in a storage area corresponding to the sector number in the storage device, generates access data from the access request by associating the sector number included in the access request with the sector group identifier; a monitor that determines whether the access request is unauthorized, based on the access data and rule information indicating a rule for accessing the sector group stored in the storage device; a determiner that determines, based on the access data, whether the access request seeks to access the sector group related to the application stored in the storage device; and a manager that, if it is determined that the access request seeks to access the sector group related to the application and the operating system makes a change to the application storage area, obtains application information related to the application and updates, based on the application information obtained, the rule information and the correspondence information.

According to the present aspect, the rule information and the correspondence information are updated in response to the change made to the application storage area by the operating system. Thus, even if a new application is added to the operating system and an unauthorized computer program disables or tampers with the access control function of the operating system, the validity of the access request from the operating system can be accurately determined based on the rule information updated and the correspondence information updated.

For example, the change made to the application storage area may be one of addition, deletion, and updating of the application.

According to the present aspect, the rule information and the correspondence information can be updated in response to one of the addition, the deletion, and the updating of the application made by the operating system.

For example, the manager may include an application database related to the application stored in the application storage area, and determine, by comparison between the application storage area and the application database, whether the operating system makes one of the addition, the deletion, and the updating of the application, if it is determined that the access request seeks to access the sector group related to the application.

According to the present aspect, whether the operating system makes one of the addition, the deletion, and the updating can be easily determined by comparison between the application storage area and the application database.

For example, if the operating system makes the addition of the application, the manager may add: the rule related to the application added, to the rule information; and the correspondence related to the application added, to the correspondence information.

According to the present aspect, when addition of an application is made by the operating system, the rule information and the correspondence information can be appropriately updated.

For example, if the operating system makes the deletion of the application, the manager may delete: the rule related to the application deleted, from the rule information; and the correspondence related to the application deleted, from the correspondence information.

According to the present aspect, when deletion of an application is made by the operating system, the rule information and the correspondence information can be appropriately updated.

For example, if the operating system makes the updating of the application, the manager may change: the rule related to the application updated, in the rule information; and the correspondence related to the application updated, in the correspondence information.

According to the present aspect, when updating of an application is made by the operating system, the rule information and the correspondence information can be appropriately updated.

For example, the manager may update the rule information and the correspondence information, based on, as the application information, one of a developer definition policy that defines a condition for protecting the application and a protection rule that is set to protect the application.

According to the present aspect, the rule information and the correspondence information can be easily updated based on the developer definition policy and the protection rule.

A control method of an information processing device according to an aspect of the present disclosure is a control method performed by an information processing device that includes: an operating system that includes an application storage area for storing an application and executes the application; and a control system that accesses a sector group stored in a storage device, in response to an access request from the operating system. The control method includes: generating, by reference to correspondence information indicating a correspondence between a sector number and a sector group identifier of the sector group stored in a storage area corresponding to the sector number in the storage device, access data from the access request by associating the sector number included in the access request with the sector group identifier; determining whether the access request is unauthorized, based on the access data and rule information indicating a rule for accessing the sector group stored in the storage device; determining, based on the access data, whether the access request seeks to access the sector group related to the application stored in the storage device; and obtaining, if it is determined that the access request seeks to access the sector group related to the application and the operating system makes a change to the application storage area, application information related to the application and updating, based on the application information obtained, the rule information and the correspondence information.

According to the present aspect, the rule information and the correspondence information are updated in response to the change made to the application storage area by the operating system. Thus, even if a new application is added to the operating system and an unauthorized computer program disables or tampers with the access control function of the operating system, the validity of the access request from the operating system can be accurately determined based on the rule information updated and the correspondence information updated.

It should be noted that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, exemplary embodiments will be described in detail with reference to the Drawings.

Note that each of the following embodiments shows a generic or specific example. The numerical values, shapes, materials, structural components, the arrangement and connection of the structural components, steps, the processing order of the steps, etc., shown in the following embodiments are mere examples, and thus are not intended to limit the present disclosure. Furthermore, among the structural components described in the following embodiments, structural components not recited in any one of the independent claims that indicate the broadest concepts are described as optional structural components.

Embodiment

1. Configuration of Information Processing Device

First, the configuration of information processing device 2 is described with reference to FIG. 1 to FIG. 6. FIG. 1 is a block diagram illustrating the configuration of information processing device 2 according to Embodiment. FIG. 2 illustrates an example of device access log 36 according to Embodiment. FIG. 3 illustrates an example of sector-group database 30 according to Embodiment. FIG. 4 illustrates an example of sector-group access log 38 according to Embodiment. FIG. 5 illustrates an example of sector-group access information 32 according to Embodiment. FIG. 6 illustrates an example of sector-group access rule database 34 according to Embodiment.

As illustrated in FIG. 1, information processing device 2 includes hardware 4, virtualization control system 6, a plurality of guest operating systems 8 (hereinafter, each referred to as "guest OS 8"), and host operating system 10 (hereinafter, referred to as "host OS 10"). Information processing device 2 determines unauthorized access to a vehicle, such as an automobile.

Information processing device 2 is electrically connected to external storage device 12. External storage device 12 is an example of a storage device and implemented by a hard disk drive (HDD) for example. External storage device 12 includes a plurality of storage areas to store sector groups (data). A sector number is assigned for each of the plurality of storage areas. As described later, host OS 10 accesses a sector group stored in external storage device 12 in response to an access request from guest OS 8. The sector number specifies the storage area that stores this sector group in external storage device 12. A sector number is indicated in four digits, for example.

In the present specification, a sector group refers to information containing a file or file information (i-node information of Linus [registered trademark], for example) or refers to information about a file system. The sector group includes a file related to application 15 (described later), for example. A sector group name is an example of a sector group identifier, and refers to a file name indicating the file itself or a specific name (designated by a directory name, for example) of the information containing the file information. The file information refers to meta information that includes a file name, a file size, access permission, a change history, and information required by an access control system.

Hardware 4 includes a processor that includes a central processing unit (CPU) or an electronic control unit (ECU) for example. Hardware 4 provides an execution environment for a plurality of computer programs. Here, hardware 4 may be implemented by a single processor or by a plurality of processors.

Virtualization control system 6 is virtualization software that is executed on hardware 4 and that controls execution of the plurality of guest OSs 8 and host OS 10. Virtualization control system 6 is an example of a control system. Virtualization control system 6 enables the different virtualized OSs (the plurality of guest OSs 8 and host OS 10) to run on this single piece of hardware 4. In the present embodiment, virtualization control system 6 is a so-called Type-1 (bare-metal) hypervisor. Here, virtualization control system 6 receives I/O information of guest OS 8 running on the virtualization system via the hypervisor, and exchanges I/O information with external storage device 12 that is a real device.

Each of the plurality of guest OSs 8 is a front-end virtual machine (VM), such as Linux, that runs on virtualization control system 6. Guest OS 8 is an example of an operating system. Each of the plurality of guest OSs 8 includes a plurality of processes 14, application 15, access control function 16, and front-end device driver 18. For illustration purposes, only one guest OS 8 is illustrated in FIG. 1. Although the plurality of guest OSs 8 run on virtualization control system 6 in the present embodiment, this is not intended to be limiting. It is acceptable to have a configuration in which only one guest OS 8 runs on virtualization control system 6.

Each of the plurality of processes 14 is a computer program for executing a function of guest OS 8. To execute the function of guest OS 8, each of the plurality of processes 14 generates an access request to access a sector group (for example, to write to or read from the sector group) stored in external storage device 12. Furthermore, each of the plurality of processes 14 makes a change to an application storage area, or more specifically, makes one of addition (installation), deletion (uninstallation), and updating (such as upgrading of the version) of application 15, in response to a user operation for example. For illustration purposes, FIG. 1 illustrates only one process 14. Here, the application storage area refers to a directory for storing application 15, or to an application-only sector group in the external storage device.

Application 15 is application software that is downloaded from an application delivery platform to guest OS 8 and then stored into the application storage area of guest OS 8. Examples of application include an application capable of executing a navigation function and an application capable of executing a function of reproducing content, such as music or video. The application storage area of guest OS 8 stores a directory for storing a file related to application 15. For example, this directory stores, as the file related to application 15, developer definition policy 15a that defines a condition for protecting application 15. Developer definition policy 15a is an example of application information related to application 15. For illustration purposes, FIG. 1 illustrates only one application 15. However, a plurality of applications 15 may be stored in the application storage area.

Access control function 16 is a security function of monitoring access requests generated by the plurality of processes 14. For example, assume that an unauthorized computer program, such as malware, is executed on guest OS 8 and then makes unauthorized access to the sector group stored in external storage device 12. In this case, access control function 16 discards the access request generated by the unauthorized computer program.

Front-end device driver 18 is a virtual device driver (VirtIO) that drives a virtual network interface included in guest OS 8. Front-end device driver 18 transmits an access request generated by one of the plurality of processes 14 to back-end device driver 20 (described later) of host OS 10 via virtualization control system 6. Furthermore, front-end device driver 18 receives an access response (described later) from back-end device driver 20 of host OS 10 via virtualization control system 6.

Host OS 10 is a back-end VM, such as Linux, that runs on virtualization control system 6, and is an example of a control system. Host OS 10 includes back-end device driver 20, storage 22, access log analyzer 24, sector-group access determiner 26, and control responder 28.

Back-end device driver 20 is a virtual device driver (VirtIO) that drives a virtual network interface included in host OS 10. Back-end device driver 20 obtains (receives) the access request from front-end device driver 18 of guest OS 8 via virtualization control system 6, and outputs the obtained access request to access log analyzer 24.

As described later, if sector-group access determiner 26 determines that the access request is not unauthorized, back-end device driver 20 accesses the sector group stored in external storage device 12 in response to this access request. In this case, back-end device driver 20 transmits an access response indicating a result of accessing the sector group stored in external storage device 12, to front-end device driver 18 of guest OS 8 via virtualization control system 6.

Storage 22 is a memory that stores sector-group database 30, sector-group access information 32, and sector-group access rule database 34. Sector-group database 32, sector-group access information 32, and sector-group access rule database 34 are described later.

Access log analyzer 24 is an example of an analyzer, and obtains device access log 36 as a log of the access request obtained by back-end device driver 20. Here, device access log 36 is a database in table form illustrated in FIG. 2 for example. In device access log 36 illustrated in FIG. 2, a timestamp, an operation target VM, an operation type, a sector number, and a payload are associated with each other. The timestamp refers to information indicating a date and time of transmission of the access request from front-end device driver 18 of guest OS 8. The operation target VM refers to information indicating guest OS 8 that is the transmission source of the access request, and is represented by a corresponding one of consecutive numbers "1", "2", . . . , and "n" assigned to the plurality of guest OSs 8. The operation type refers to information indicating a type of operation to be performed on the sector group in response to the access request. Examples of the operation type include "read" (reading out the sector group) or "write" (writing to the sector group). The sector number refers to information specifying the storage area of the sector group in external storage device 12. The payload refers to information indicating details of an operation request (such as information about details to be written for example).

A first row of device access log 36 illustrated as an example in FIG. 2 stores: a) "9/3/2021 18:39:01.032" as the timestamp; b) "1" as the operation target VM; c) "read" as the operation type; d) "1111" as the sector number; and e) "e38182 (the rest is omitted)" as the payload. More specifically, the first row of device access log 36 indicates that guest OS 8 assigned the number "1" transmits an access request to read out (read) the sector group stored in a storage area corresponding to the sector number "1111" in external storage device 12.

Access log analyzer 24 generates sector-group access log 38 from device access log 36, based on sector-group database 30 stored in storage 22. Here, sector-group database 30 is in table form as illustrated in FIG. 3 for instance, and is an example of correspondence information. As illustrated in FIG. 3, sector-group database 30 indicates a correspondence between a sector number and a name of a sector group stored in a storage area corresponding to the sector number in external storage device 12. Sector-group database 30 is generated at first startup of information processing device 2, for example. Although the example of FIG. 3 shows a one-to-one correspondence between a sector group name and a sector group, this is not intended to be limiting. A single sector group name may correspond to a plurality of sector groups.

A first row of sector-group database 30 in the example in FIG. 3 stores: a) "/home/key/secret.dat" as the sector group name; and b) "1111" as the sector number. More specifically, the first row of sector-group database 30 indicates that the sector group having the sector group name "/home/key/secret.dat" is stored in the storage area corresponding to the sector number "1111" in external storage device 12. Note that sector-group database 30 is updated when a sector number is added as a result of an increase in the access request log.

Access log analyzer 24 first extracts only the log related to guest OS 8 (like guest OS 8 assigned the number "1") that is a monitoring target, from device access log 36. Next, by reference to to sector-group database 30 stored in storage 22, access log analyzer 24 generates sector-group access log 38 by associating the sector number included device access log 36 extracted, with the sector group name corresponding to this sector number. Access log analyzer 24 outputs sector-group access log 38 generated, to sector-group access determiner 26.

Here, sector-group access log 38 is a database in table form as illustrated in FIG. 4 for instance, and is an example of access data. In sector-group access log 38 illustrated in FIG. 4, a timestamp, an operation type, a sector number, a sector group name, and a payload are associated with each other.

A first row of sector-group access log 38 illustrated as an example in FIG. 4 stores: a) "9/3/2021 18:39:01.032" as the timestamp; b) "read" as the operation type; c) "1111" as the sector number; d) "/home/key/secret. dat" as the sector group name; and e) "e38182 (the rest is omitted)" as the payload. More specifically, the first row of sector-group access log 38 indicates that guest OS 8 assigned the number "1" transmits an access request to read out (read) the sector group having the sector group name "/home/key/secret. dat" stored in the storage area corresponding to the sector number "1111" in external storage device 12, on a date and time "9/3/2021 18:39:01.032".

Furthermore, access log analyzer 24 updates sector-group access information 32 stored in storage 22, based on sector-group access log 38 generated. Here, sector-group access information 32 is a database in table form as illustrated in FIG. 5 for instance. In sector-group access information 32 illustrated in FIG. 5, a sector group name, a latest access date and time, a latest accessing process, a latest operation, and a last sector number are associated with each other.

A first row of sector-group access information 32 illustrated as an example in FIG. 5 stores: a) "/var/log/system. log" as the sector group name; b) "9/17/2021 04:43:21.213" as the latest access date and time; c) "systemlogd" as the latest accessing process; d) "write" as the latest operation; and e) "1234" as the last sector number. More specifically, the first row of sector-group access information 32 indicates that the latest access made to the sector group having the sector group name "/var/log/systenn. log" by the process "systemlogd" on "9/17/2021 04:43:21.213" is for writing (write) to the sector group corresponding to the sector number "1234" stored in the storage area of external storage device 12.

Sector-group access determiner 26 is an example of a monitor. Sector-group access determiner 26 determines whether an access request from guest OS 8 is unauthorized, based on sector-group access information 32 and sector-group access rule database 34 stored in storage 22 and sector-group access log 38.

Here, sector-group access rule database 34 indicates a correspondence for each of the sector groups stored in external storage device 12 between a sector group name of the sector group and a rule for accessing the sector group. To be more specific, sector-group access rule database 34 is in table form as illustrated in FIG. 6 for instance, and is an example of rule information. In sector-group access rule database 34 illustrated in FIG. 6, a sector group name, an access-authorized process, an access-authorized operation, and a sector group type are associated with each other. The access-authorized process refers to information (rule) indicating a process authorized to access the sector group. The access-authorized operation refers to information (rule) indicating an operation authorized to access the sector group. The sector group type refers to information indicating a type of the sector group (such as personal information, log, or i-node).

A first row of sector-group access rule database 34 in the example in FIG. 6 stores: a) "/home/key/secret. dat" as the sector group name; b) "updateservice" as the access-authorized process; c) "read" as the access-authorized operation; and d) "personal information" as the sector group type. More specifically, the first row of sector-group access rule database 34 indicates that the process authorized to access the sector group having the sector group name "/home/key/secret. dat" and including "personal information" is "updateservice" and that the operation authorized to access is reading out (read).

In the present embodiment, as a rule for accessing a sector group stored in external storage device 12, sector-group access rule database 34 includes a process and an operation that are be authorized to access this sector group. However, this is not intended to be limiting. Either one of the process and the operation may be included.

By comparison between sector-group access rule database 34 and sector-group access log 38, sector-group access determiner 26 determines whether the process and operation for accessing the sector group stored in external storage device 12 match the rule specified in sector-group access rule database 34. Furthermore, by comparison between sector-group access information 32 and sector-group access log 38, sector-group access determiner 26 determines whether a behavior of guest OS 8 to access the sector group is an authorized behavior. Sector-group access determiner 26 outputs a result of the determination to control responder 28.

Examples of an authorized behavior include: a) an operation of additionally writing to a log file (a sector group indicating a log); and b) an operation of reading a sector group at first startup of information processing device 2. For the former operation, only the additional writing is typically to be performed on the log file even if the log file is given a write authorization. On this account, an operation to alter or delete a part of the log file is possibly determined as an unauthorized access. For the latter operation, the sector group indicating, for instance, a policy of access control function 16 of guest OS 8 is read out typically only at first startup of information processing device 2. On this account, an operation of reading this sector group after a lapse of a substantial amount of time from the first startup is possibly determined as an unauthorized access.

Sector-group access determiner 26 is an example of a determiner. Based on the sector number included in sector-group access log 38, sector-group access determiner 26 determines whether the access request from guest OS 8 seeks to access the sector group related to application 15 stored in external storage device 12. Sector-group access determiner 26 outputs a result of the determination to manager 42 (described later).

Control responder 28 controls a response, based on the result of the determination made by sector-group access determiner 26. More specifically, if sector-group access determiner 26 determines that the access request is unauthorized, control responder 28 provides, for example, error notification to external server 40 having a Security Information and Event Management (SIEM) function. If sector-group access determiner 26 determines that the access request is not unauthorized, control responder 28 instructs back-end device driver 20 to access the sector group stored in external storage device 12 in response to the access request.

Figure 7:
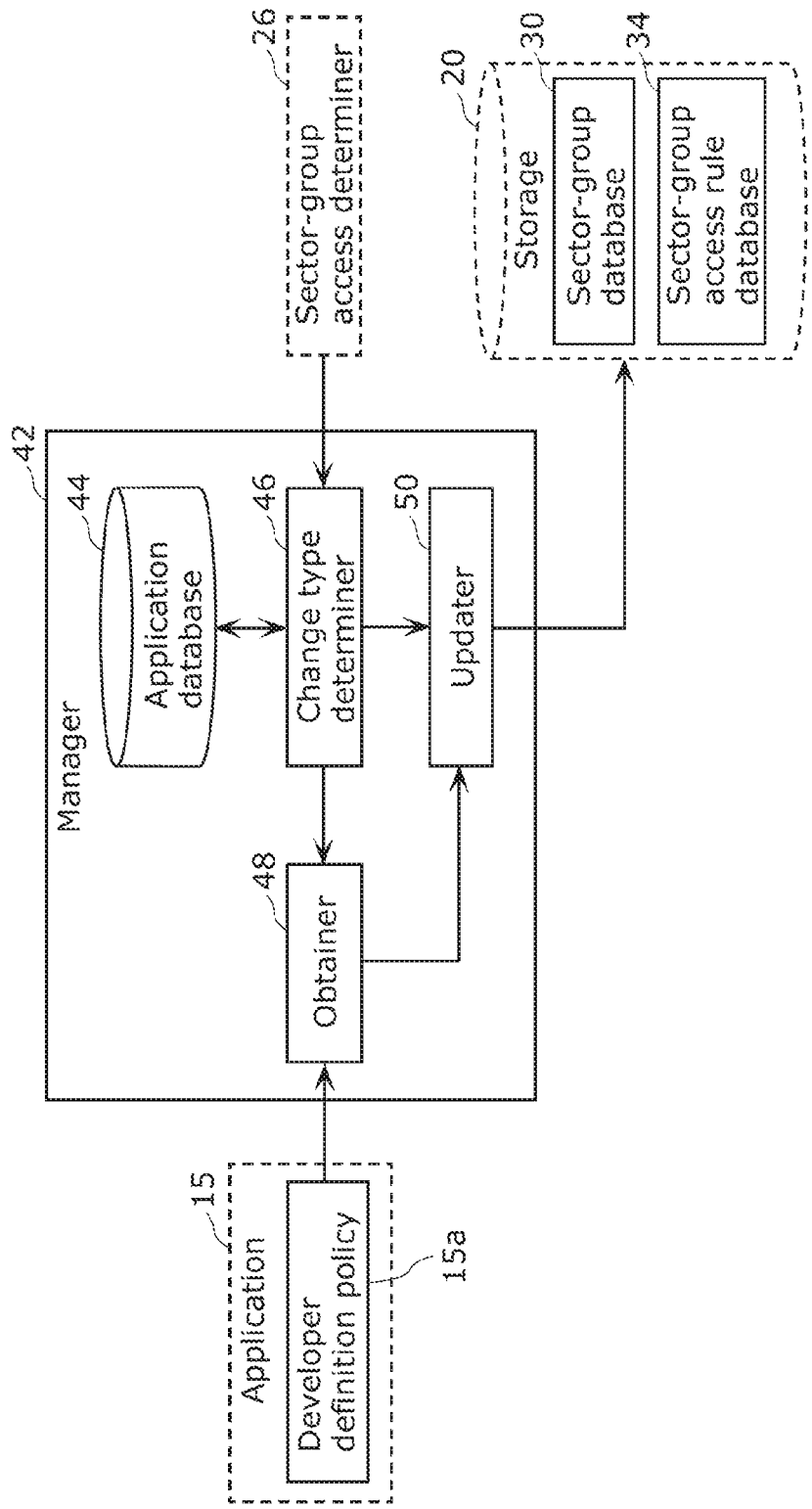
FIG. 7 is a block diagram illustrating a functional configuration of a manager according to Embodiment.

As illustrated in FIG. 1, host OS 10 further includes manager 42. Hereafter, a functional configuration of manager 42 is described with reference to FIG. 7 to FIG. 10. FIG. 7 is a block diagram illustrating the functional configuration of manager 42 according to Embodiment. FIG. 8 illustrates an example of application database 44 according to Embodiment. FIG. 9 illustrates an example of developer definition policy 15a according to Embodiment. FIG. 10 illustrates an example of directory generation destination policy 52 according to Embodiment.

As illustrated in FIG. 7, manager 42 includes application database 44, change type determiner 46, obtainer 48, and updater 50.

Application database 44 relates to application 15 stored in the application storage area of guest OS 8. More specifically, application database 44 is in table form as illustrated in FIG. 8 for instance. In application database 44 illustrated in FIG. 8, an application name, a monitoring-protection target sector group name, a sector group attribute, and a latest update date and time are associated with each other. The application name refers to a name of application 15. The monitoring-protection target sector group name refers to a name of a sector group related to application 15 and stored in a directory in the application storage area of guest OS 8. The sector group attribute refers to information indicating an attribute (application body, application component, or developer definition policy) of the sector group. The latest update date and time refers to a date and time of latest updating performed on the sector group. Note that application database 44 is updated to synchronize with the application storage area of guest OS 8 at predetermined time intervals, for example.

The determination of sector-group access determiner 26 that the access request seeks to access the sector group related to application 15 triggers change type determiner 46 to search the application storage area of guest OS 8. Then, by comparison between the application storage area and application database 44, change type determiner 46 determines whether guest OS 8 makes one of addition, deletion, and updating of application 15. Change type determiner 46 outputs a result of the determination to obtainer 48 and updater 50.

Based on the result of the determination made by change type determiner 46, obtainer 48 obtains developer definition policy 15a from the application storage area of guest OS 8. Obtainer 48 outputs developer definition policy 15a obtained, to updater 50.

Here, developer definition policy 15a is a database in table form illustrated in FIG. 9 for example. In developer definition policy 15a illustrated in FIG. 9, a storage destination directory ID, a sector group name, an access-authorized process, an access-authorized operation, and a type are associated with each other.

Note that the application storage area of guest OS 8 stores directory generation destination policy 52 together with developer definition policy 15a. Directory generation destination policy 52 is used for generation of a directory that is a storage destination of developer definition policy 15a. Directory generation destination policy 52 is a database in table form illustrated in FIG. 10 for example. In directory generation destination policy 52 illustrated in FIG. 10, a directory ID, a directory creation location, a directory name, an access-authorized operation, and a type are associated with each other. The directory ID of directory generation destination policy 52 corresponds to the storage destination directory ID of developer definition policy 15a. Note that an application-related file storage area of the directory creation location may be specified by a file path that is different from or identical to that of the application storage area.

Assume that sector-group access determiner 26 determines that the access request seeks to access the sector group related to application 15, and that change type determiner 46 determines that guest OS 8 makes one of addition, deletion, and updating of application 15. These determinations trigger updater 50 to update sector-group access database 30 and sector-group access rule database 34.

2. Operation of Information Processing Device

[2-1. Overall Operation of Host OS]

Figure 11:
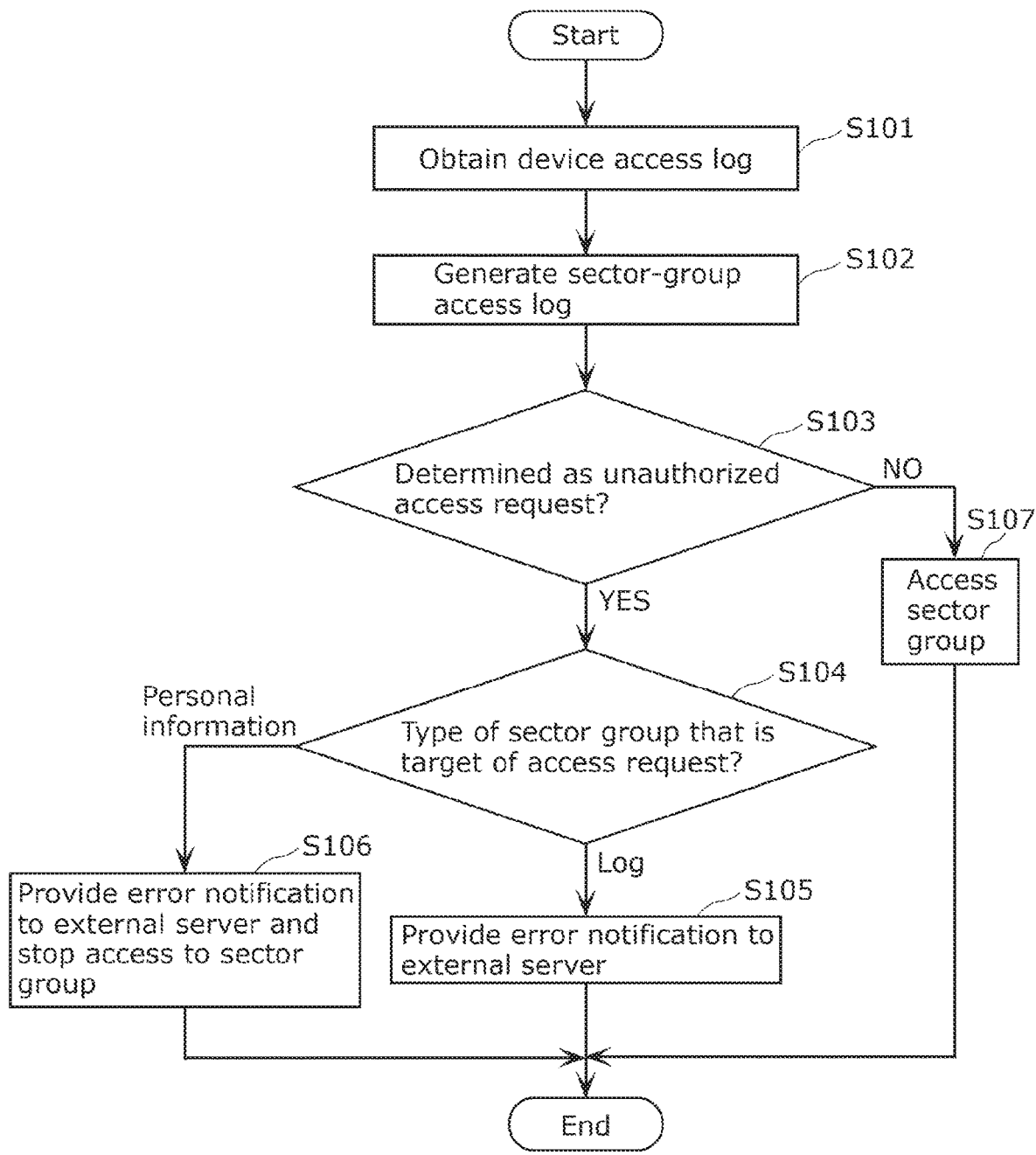
FIG. 11 is a flowchart of an overall operation performed by a host OS according to Embodiment.

The overall operation of host OS 10 according to Embodiment is described with reference to FIG. 11. FIG. 11 is a flowchart of the overall operation performed by host OS 10 according to Embodiment.

As illustrated in FIG. 11, access log analyzer 24 first obtains device access log 36 as a log of the access request obtained by back-end device driver 20 (S101).

Next, access log analyzer 24 extracts only the log that is related to guest OS 8, which is the monitoring target, from device access log 36. Then, by reference to sector-group database 30 stored in storage 22, access log analyzer 24 generates sector-group access log 38 by associating the sector number included in the extracted log with the sector group name corresponding to this sector number (S102).

Next, sector-group access determiner 26 determines whether the access request from guest OS 8 is unauthorized, based on sector-group access information 32 and sector-group access rule database 34 stored in storage 22 and sector-group access log 38 (S103). Sector-group access determiner 26 outputs a result of the determination to control responder 28.

If sector-group access determiner 26 determines that the access request is unauthorized (YES in S103), control responder 28 determines a type of the sector group that is a target for the access request, based on the sector group name included in sector-group access log 38 (S104).

If the type of the sector group is a "log" ("Log" in S104), control responder 28 provides error notification to external server 40 (S105). In this case, control responder 28 provides the error notification to external server 40 at predetermined regular timing (every five minutes, for example). At this time, sector-group access determiner 26 deletes information related to the unauthorized access request from sector-group access information 32. After this, the flowchart in FIG. 11 ends.

On the other hand, if the type of the sector group is "personal information" ("Personal information" in S104), control responder 28 provides error notification to external server 40 and also instructs back-end device driver 20 to stop the access to the sector group made in response to the access request (S106). In this case, control responder 28 immediately provides the error notification to external server 40 and immediately instructs the stop of the access to the sector group. Note that control responder 28 may notify external server 40 of sector-group access log 38, which is determined as being unauthorized, together with the error notification. At this time, sector-group access determiner 26 deletes information related to the unauthorized access request from sector-group access information 32. After this, the flowchart in FIG. 11 ends.

Referring back to S103, if sector-group access determiner 26 determines that the access request is not unauthorized (NO in S103), control responder 28 instructs back-end device driver 20 to access the sector group stored in external storage device 12 in response to the access request (S107). At this time, sector-group access determiner 26 updates sector-group access information 32, based on the details of the access request. After this, the flowchart in FIG. 11 ends.

[2-2. Operation of Access Log Analyzer]

Figure 12:
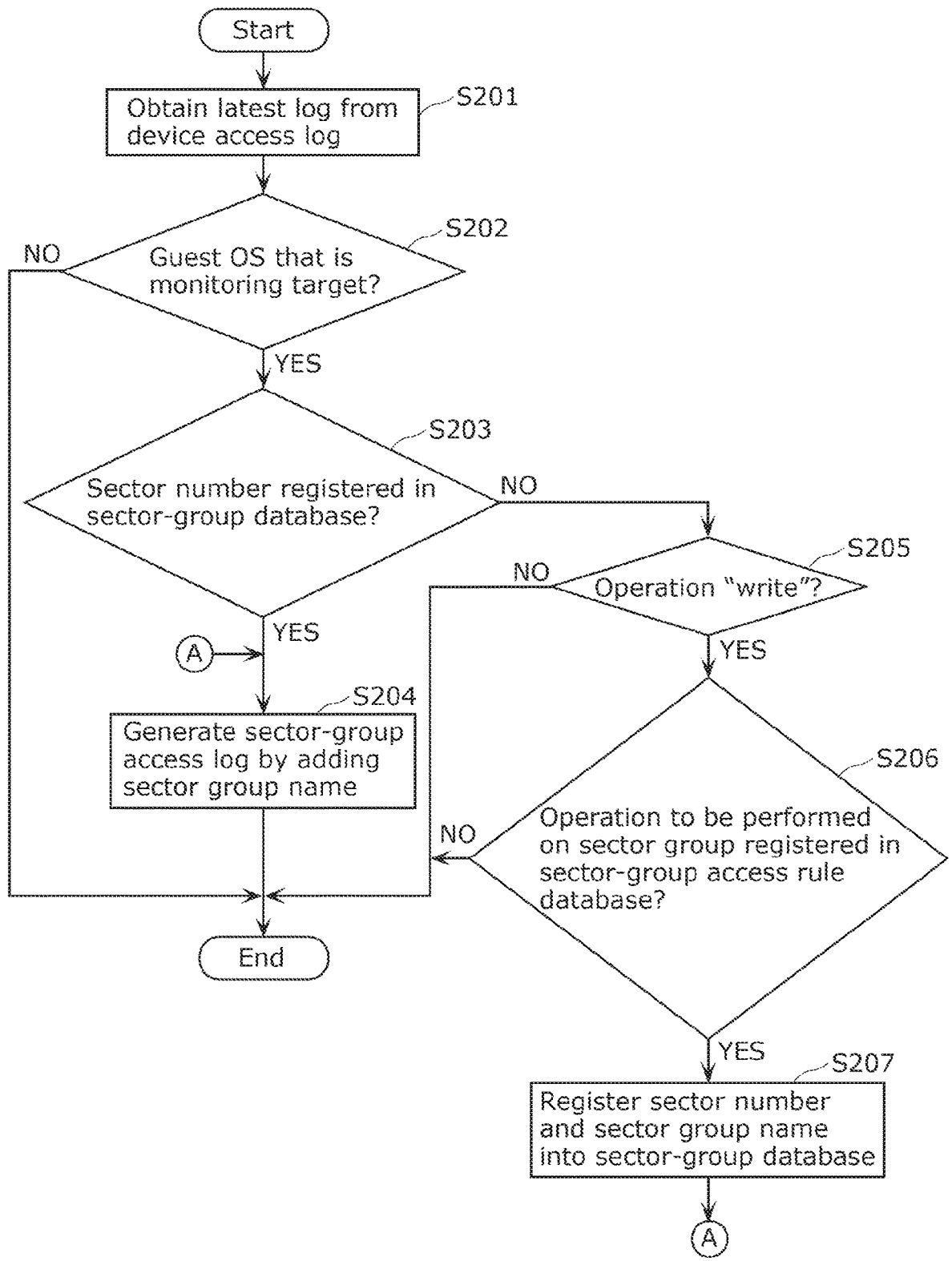
FIG. 12 is a flowchart of an operation performed by an access log analyzer according to Embodiment.

The operation of access log analyzer 24 is described with reference to FIG. 12. FIG. 12 is a flowchart of the operation performed by access log analyzer 24 according to Embodiment. As illustrated in FIG. 12, access log analyzer 24 first obtains a latest log from device access log 36 (S201). Next, access log analyzer 24 determines whether the operation target VM included in the obtained latest log is guest OS 8 that is the monitoring target (S202). If the operation target VM included in the obtained latest log is not guest OS 8 that is the monitoring target (NO in S202), the flowchart in FIG. 12 ends.

In contrast, if the operation target VM included in the obtained latest log is guest OS 8 that is the monitoring target (YES in S202), access log analyzer 24 determines whether the sector number included in the obtained latest log is registered in sector-group database 30 (S203).

If the sector number included in the obtained latest log is registered in sector-group database 30 (YES in S203), access log analyzer 24 generates sector-group access log 38 by associating the sector number included in the obtained latest log with the sector group name corresponding to this sector number registered in sector-group database 30 (S204). After this, the flowchart in FIG. 12 ends.

In contrast, if the sector number included in the obtained latest log is not registered in sector-group database 30 (NO in S203), access log analyzer 24 determines whether the operation type included in the obtained latest log is "write" (S205). If the operation type included in the obtained latest log is not "write" (NO in S205), the flowchart in FIG. 12 ends.

In contrast, if the operation type included in the obtained latest log is "write" (YES in S205), access log analyzer 24 determines whether the obtained latest log indicates an operation that is to be performed on the sector group registered in sector-group access rule database 34 (S206). If the obtained latest log does not indicate the operation that is to be performed on the sector group registered in sector-group access rule database 34 (NO in S206), the flowchart in FIG. 12 ends.

In contrast, if the obtained latest log indicates the operation that is to be performed on the sector group registered in sector-group access rule database 34 (YES in S206), access log analyzer 24 registers the sector number and the sector group name corresponding to the sector number into sector-group database 30 (S207) and proceeds to Step S204.

[2-3. Operation of Sector-Group Access Determiner]

Figure 13:
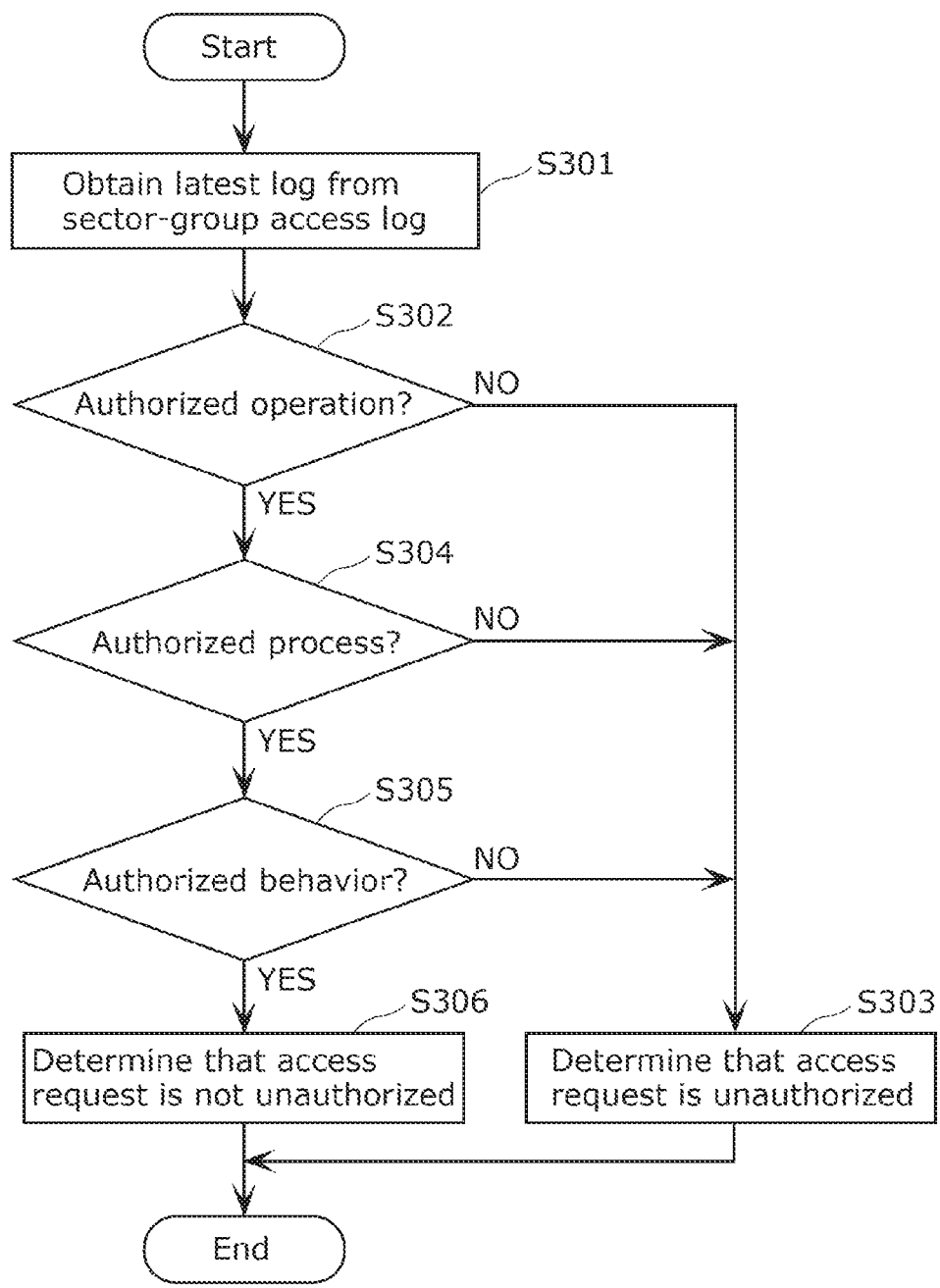
FIG. 13 is a flowchart of an operation performed by a sector-group access determiner according to Embodiment.

The operation of sector-group access determiner 26 is described in detail with reference to FIG. 13. FIG. 13 is a flowchart of the operation performed by sector-group access determiner 26 according to Embodiment.

As illustrated in FIG. 13, sector-group access determiner 26 first obtains a latest log from sector-group access log 38 (S301). Next, sector-group access determiner 26 determines whether the operation type included in the obtained latest log is the access-authorized operation included in sector-group access rule database 34 and corresponding to the sector group name of the latest log (S302). More specifically, sector-group access determiner 26 determines whether the access request is unauthorized, based on the rule information related to a read-write authorization given to the sector group. If the operation type included in the obtained latest log is not the access-authorized operation (NO in S302), sector-group access determiner 26 determines that the access request from guest OS 8 is unauthorized (S303). After this, the flowchart in FIG. 13 ends.

In contrast, if the operation type included in the obtained latest log is the access-authorized operation (YES in S302), sector-group access determiner 26 determines whether the process is the access-authorized process included in sector-group access rule database 34 and corresponding to the sector group name of the latest log (S304). If the process is not the access-authorized process (NO in S304), sector-group access determiner 26 determines that the access request from guest OS 8 is unauthorized (S303). After this, the flowchart in FIG. 13 ends.

In contrast, if the process is the access-authorized process (YES in S304), sector-group access determiner 26 determines, based on sector-group access information 32, whether a behavior of the access to the sector group stored in external storage device 12 is an authorized behavior (S305). If the behavior is not the authorized behavior (NO in S305), sector-group access determiner 26 determines that the access request from guest OS 8 is unauthorized (S303). After this, the flowchart in FIG. 13 ends.

In contrast, if the behavior is the authorized behavior (YES in S305), sector-group access determiner 26 determines that the access request from guest OS 8 is not unauthorized (S306). After this, the flowchart in FIG. 13 ends.

Here, the process of Step S305 of the flowchart in FIG. 13 is described in detail with reference to FIG. 14 and FIG. 15. Each of FIG. 14 and FIG. 15 is a flowchart illustrating in detail a process of Step S305 of the flowchart in FIG. 13.

Based on a first behavior rule to an Nth behavior rule, sector-group access determiner 26 determines whether the behavior is authorized by each of the first behavior rule to the Nth behavior rule.

Figure 14:
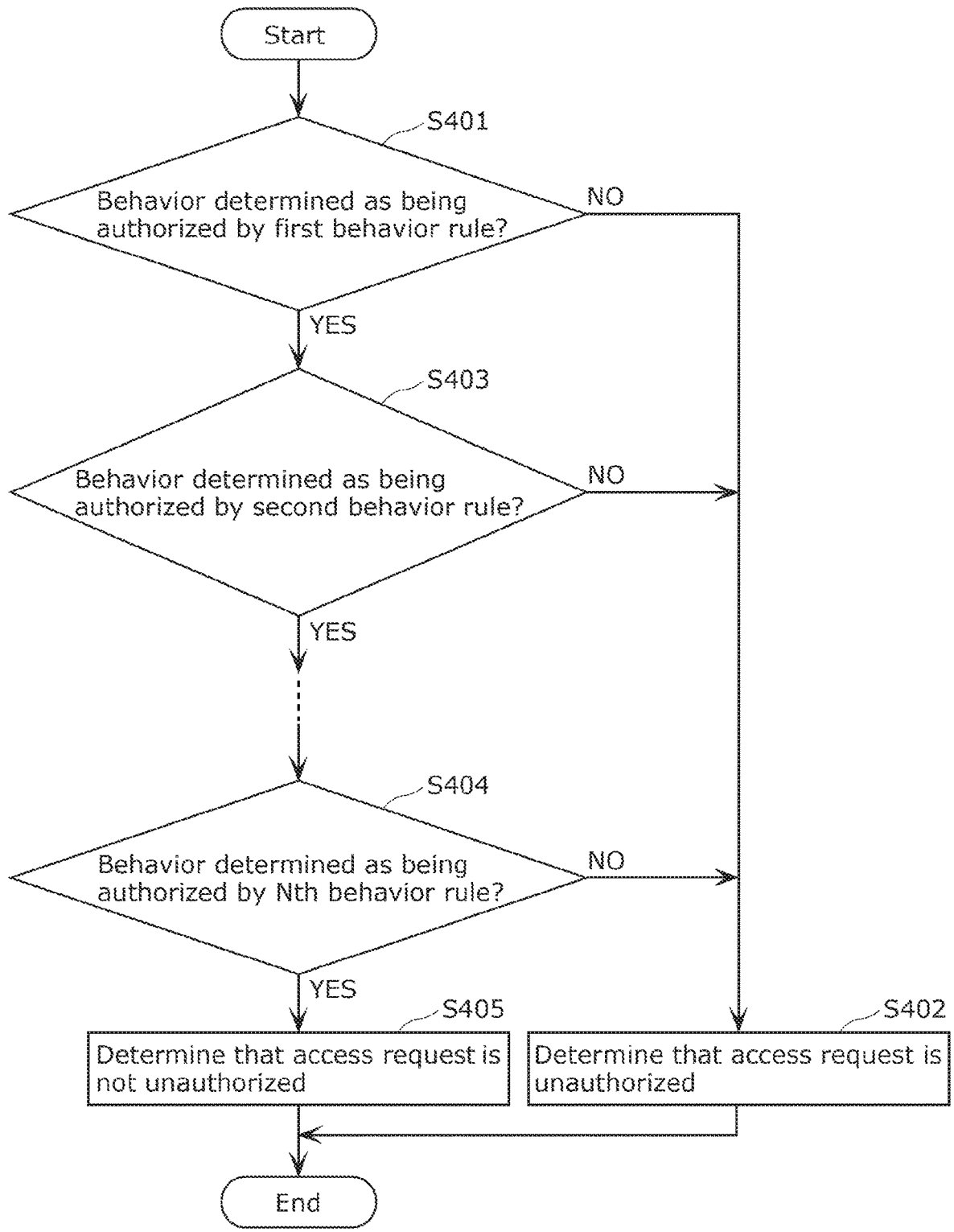
FIG. 14 is a flowchart illustrating in detail a process of Step S305 of the flowchart in FIG. 13.
Figure 15:
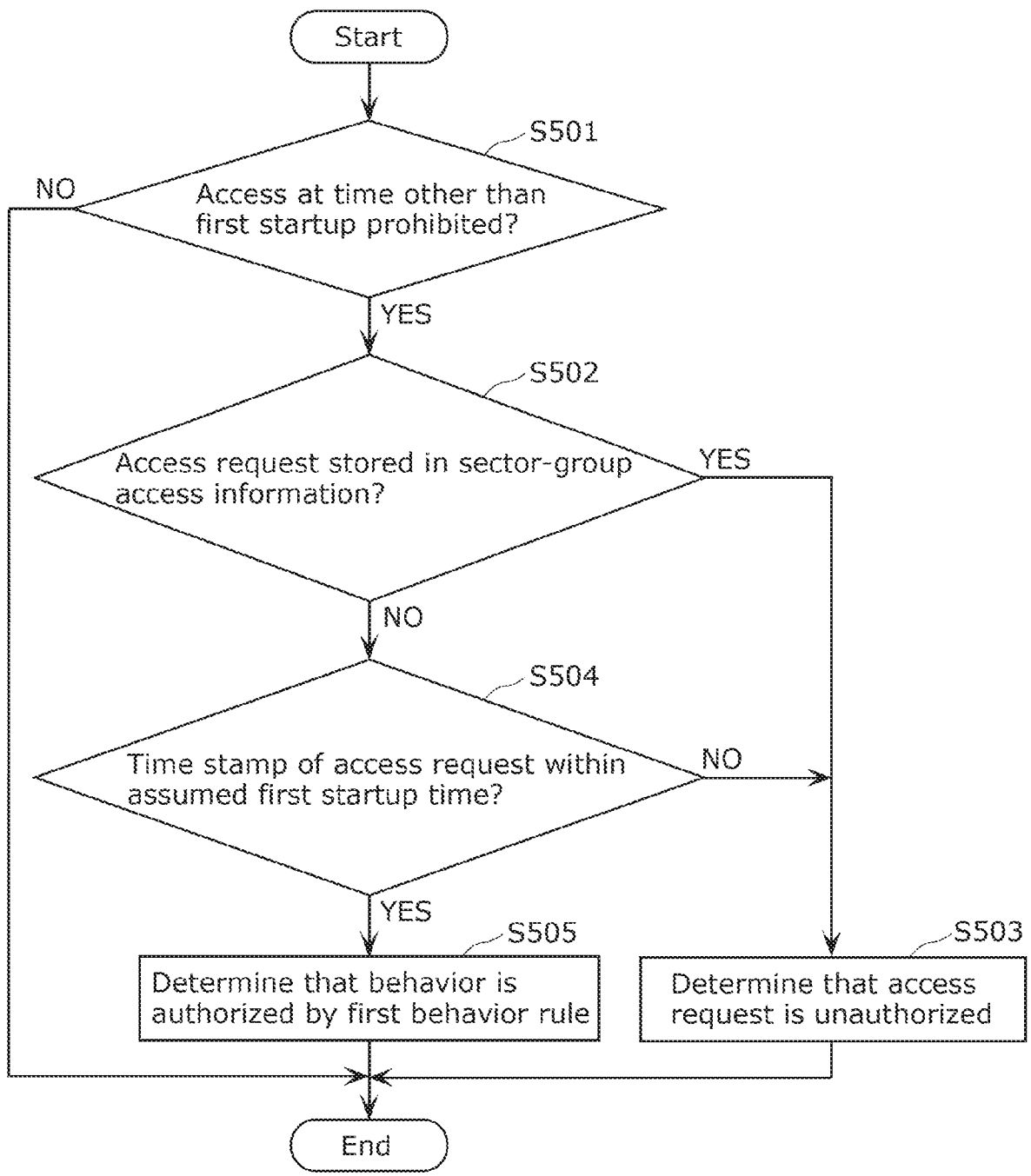
FIG. 15 is a flowchart illustrating in detail a process of Step S305 of the flowchart in FIG. 13.

If not, sector-group access determiner 26 determines whether the behavior is authorized by the first behavior rule as illustrated in FIG. 14 (S401). If the behavior is not authorized by the first behavior rule (NO in S401), sector-group access determiner 26 determines that the access request from guest OS 8 is unauthorized (S402). After this, the flowchart in FIG. 14 ends.

In contrast, if the behavior is authorized by the first behavior rule (YES in S401), sector-group access determiner 26 determines whether the behavior is authorized by the second behavior rule (S403). If the behavior is not authorized by the second behavior rule (NO in S403), sector-group access determiner 26 determines that the access request from guest OS 8 is unauthorized (S402). After this, the flowchart in FIG. 14 ends.

Similarly, if the behavior is authorized by the second behavior rule (YES in S403), sector-group access determiner 26 determines whether the behavior is authorized by the Nth behavior rule (S404). If the behavior is not authorized by the Nth behavior rule (NO in S404), sector-group access determiner 26 determines that the access request from guest OS 8 is unauthorized (S402). After this, the flowchart in FIG. 14 ends.

If the behavior is authorized by the Nth behavior rule (YES in S404), sector-group access determiner 26 determines that the access request from guest OS 8 is not unauthorized (S405). After this, the flowchart in FIG. 14 ends.

Next, a method of determining the behavior using the first behavior rule is described with reference to FIG. 15. The first behavior rule relates to the behavior of accessing the sector group at first startup of information processing device 2, for example.

As illustrated in FIG. 15, if the access to the sector group at a time other than the first startup of information processing device 2 is not prohibited (NO in S501), the flowchart in FIG. 15 ends. In contrast, if the access to the sector group at a time other than the first startup of information processing device 2 is prohibited (YES in S501), sector-group access determiner 26 determines whether the access request from guest OS 8 is stored in sector-group access information 32 (S502).

If the access request from guest OS 8 is stored in sector-group access information 32 (YES in S502), sector-group access determiner 26 determines that the access request from guest OS 8 is unauthorized (S503). After this, the flowchart in FIG. 15 ends.

In contrast, if the access request from guest OS 8 is not stored in sector-group access information 32 (NO in S502), sector-group access determiner 26 determines whether the timestamp of the access request is within an assumed first startup time period (one minute, for example) (S504). If the timestamp of the access request is not within the assumed first startup time period (NO in S504), sector-group access determiner 26 determines that the access request is unauthorized (S503). After this, the flowchart in FIG. 15 ends.

In contrast, if the timestamp of the access request is within the assumed first startup time period (YES in S504), sector-group access determiner 26 determines that the behavior is authorized by the first behavior rule (S505). In this case, sector-group access determiner 26 stores the access request from guest OS 8 into sector-group access information 32. After this, the flowchart in FIG. ends.

[2-4. Operation of Sector-Group Access Determiner and Manager]

Figure 16:
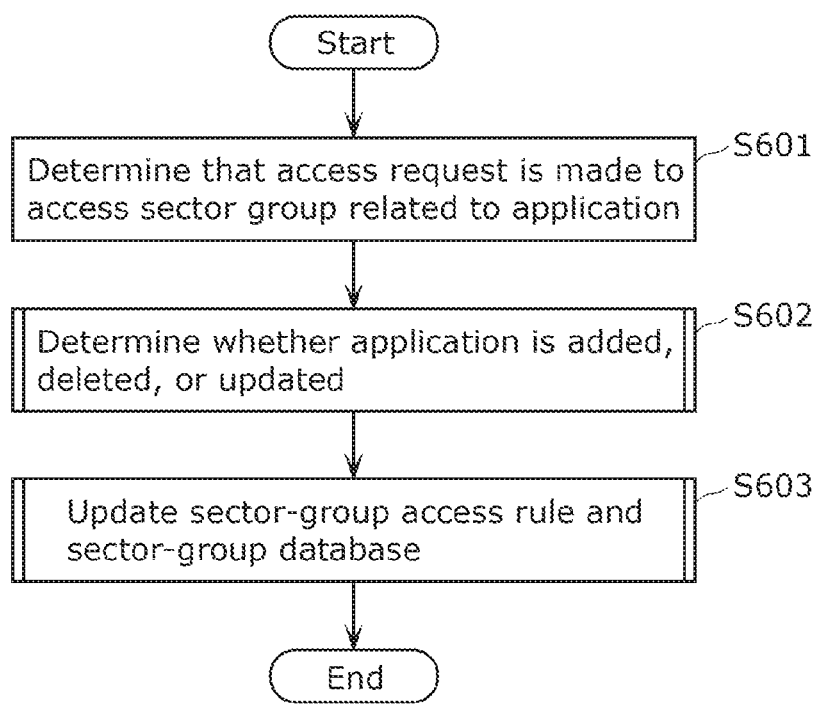
FIG. 16 is a flowchart of an operation performed by the sector-group access determiner and the manager according to Embodiment.

The operation of sector-group access determiner 26 and manager 42 is described in detail with reference to FIG. 16. FIG. 16 is a flowchart of the operation performed by sector-group access determiner 26 and manager 42 according to Embodiment.

The following describes a case where guest OS 8 requests to access the sector group related to application 15 among a plurality of sector groups stored in external storage device 12.

As illustrated in FIG. 16, sector-group access determiner 26 determines that the access request from guest OS 8 seeks to access the sector group related to application 15, based on the sector number included in sector-group access log 38 (S601). Sector-group access determiner 26 outputs the result of the determination to change type determiner 46 of manager 42.

Change type determiner 46 of manager 42 compares the application storage area and application database 44 by mounting the application storage area on host OS 10 for reference, and then determines whether guest OS 8 makes one of addition, deletion, and updating of application 15 (S602). Change type determiner 46 outputs a result of the determination to obtainer 48 and updater 50.

Updater 50 of manager 42 updates sector-group database 30 and sector-group access rule database 34 (S603).

Figure 17:
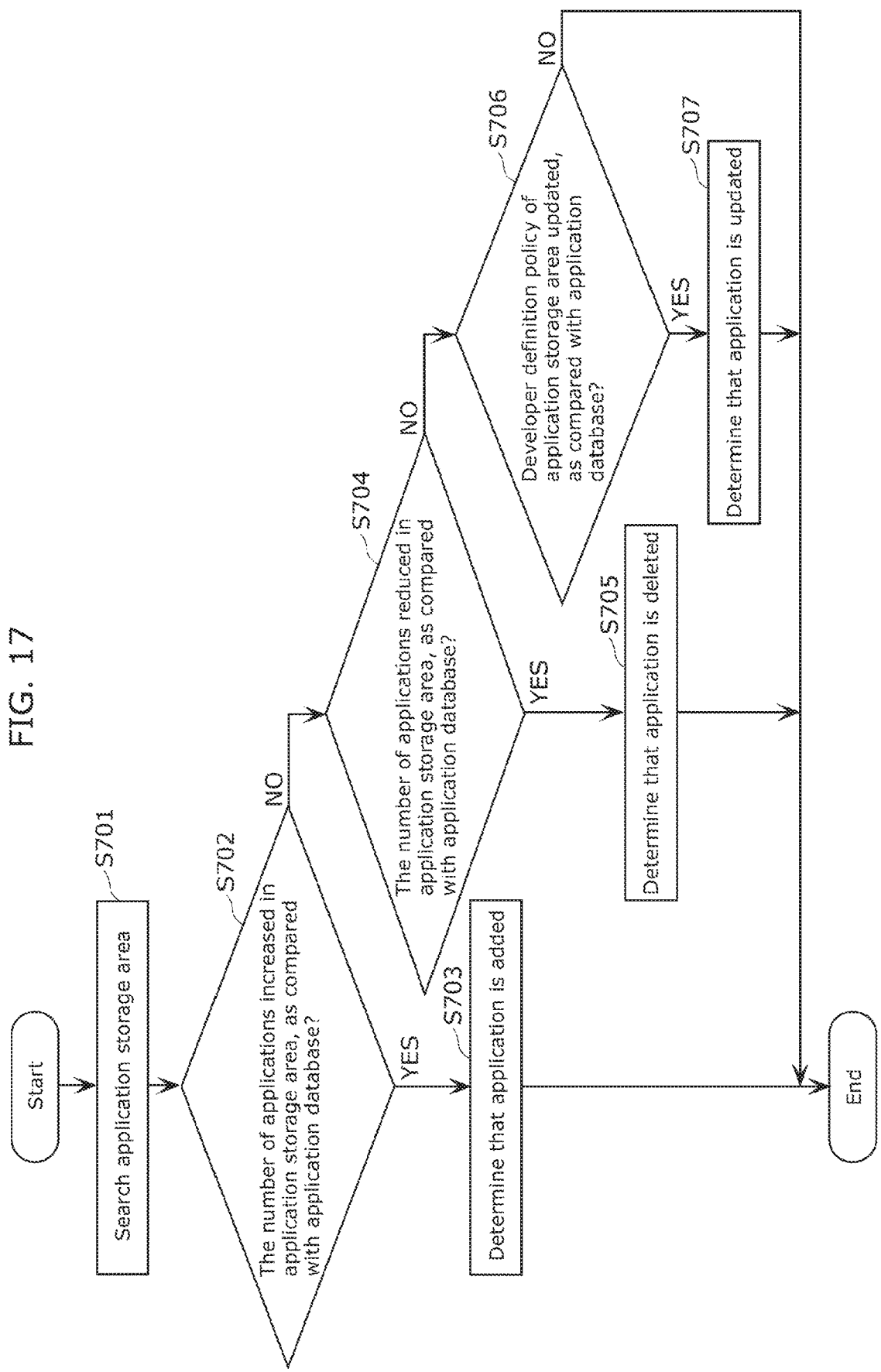
FIG. 17 is a flowchart illustrating in detail a process performed in Step S602 of the flowchart in FIG. 16.

Here, the process of Step S602 of the flowchart in FIG. 16 is described in detail with reference to FIG. 17. FIG. 17 is a flowchart illustrating in detail the process performed in Step S602 of the flowchart in FIG. 16.

As illustrated in FIG. 17, the determination of sector-group access determiner 26 that the access request seeks to access the sector group related to application 15 triggers change type determiner 46 of manager 42 to search the application storage area of guest OS 8 (S701).

If determining that the number of applications 15 is increased as compared with application database 44 (YES in S702), change type determiner 46 determines that guest OS 8 adds application 15 (S703). For example, application database 44 illustrated in FIG. 8 stores data related to application 15 for each of "navigation" and "Music Store". On the other hand, if the application storage area stores application 15 for each of "navigation", "Music Store", and "Coupon Storage", change type determiner 46 determines that guest OS 8 adds application 15 of "Coupon Storage".

Referring back to Step S702, if determining that the number of applications 15 is reduced as compared with application database 44 (NO in S702 and YES in S704), change type determiner 46 determines that guest OS 8 deletes application 15 (S705). For example, application database 44 illustrated in FIG. 8 stores data related to application 15 for each of "navigation", "Music Store", and "Coupon Storage". On the other hand, if the application storage area stores application 15 for each of "navigation" and "Music Store", change type determiner 46 determines that guest OS 8 deletes application 15 of "Coupon Storage".

Referring back to Step S704, if determining that developer definition policy 15a of the application storage area is updated as compared with application database 44 (NO in S704 and YES in S706), change type determiner 46 determines that guest OS 8 updates application 15 (S707). For example, the latest update date and time of developer definition policy 15a of "Coupon Storage" is "9/25/2021 14:25:04.067" in application database 44 illustrated in FIG. 8. On the other hand, if the latest update date and time of developer definition policy 15a of "Coupon Storage" is "9/30/2021 12:10:03.127" in the application storage area, change type determiner 46 determines that guest OS 8 updates application 15 of "Coupon Storage". In Step S706, whether the sector information is changed may also be determined for each application 15, in addition to whether developer definition policy 15a is updated.

Although developer definition policy 15a is used as the application information in the present embodiment, this is not intended to be limiting. If an OEM or supplier has its own protection rule against a file with a particular extension, the name and extension of this file may be obtained as the application information. Then, an access rule following the protection rule set by the OEM-supplier against the file may be automatically generated and added.

For example, for a file with a log data extension (.log), a protection rule specifically for additional writing is applied. For a file with an execution application (.exe), a protection rule for write inhibit is applied. In addition to these, a protection rule may be set depending on permission information (Read, Write, or Execution) defined for each file in application 15.

As a result, application 15 can be appropriately protected in accordance with a protection policy defined in the control system (such as host OS 10 or the hypervisor).

Referring back to Step S706, if change type determiner 46 determines that developer definition policy 15a of the application storage area is not updated as compared with application database 44 (NO in S706), the flowchart in FIG. 17 ends. In this case, Steps S103 to S107 of the flowchart in FIG. 11 described above are executed.

Figure 18:
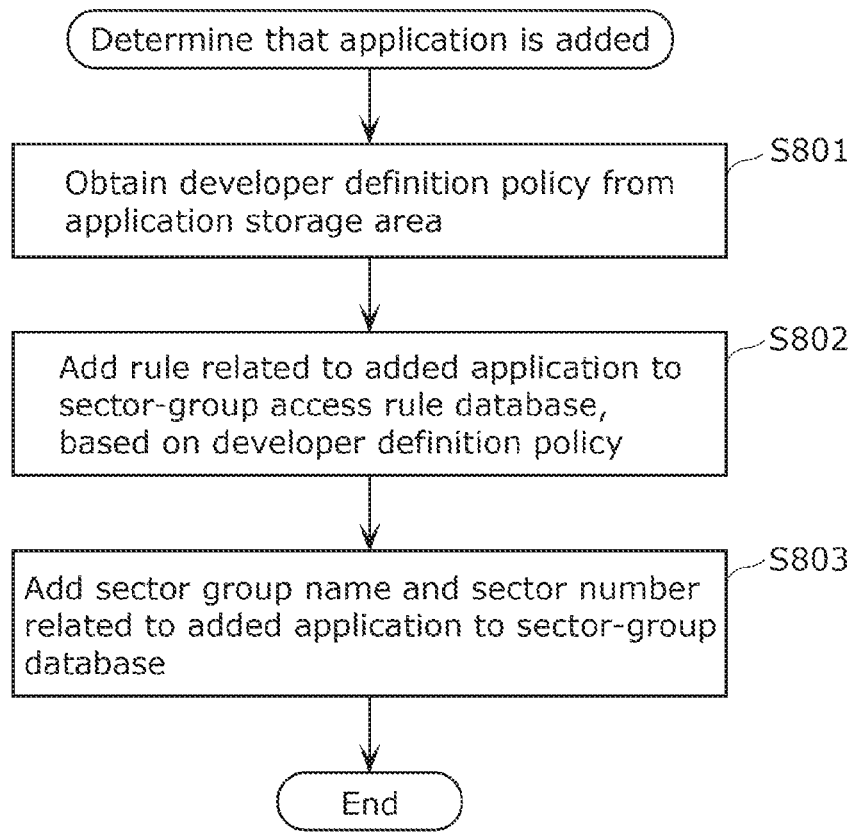
FIG. 18 is a flowchart illustrating in detail a process performed in Step S603 of the flowchart in FIG. 16 when a guest OS adds an application.
Figure 19:
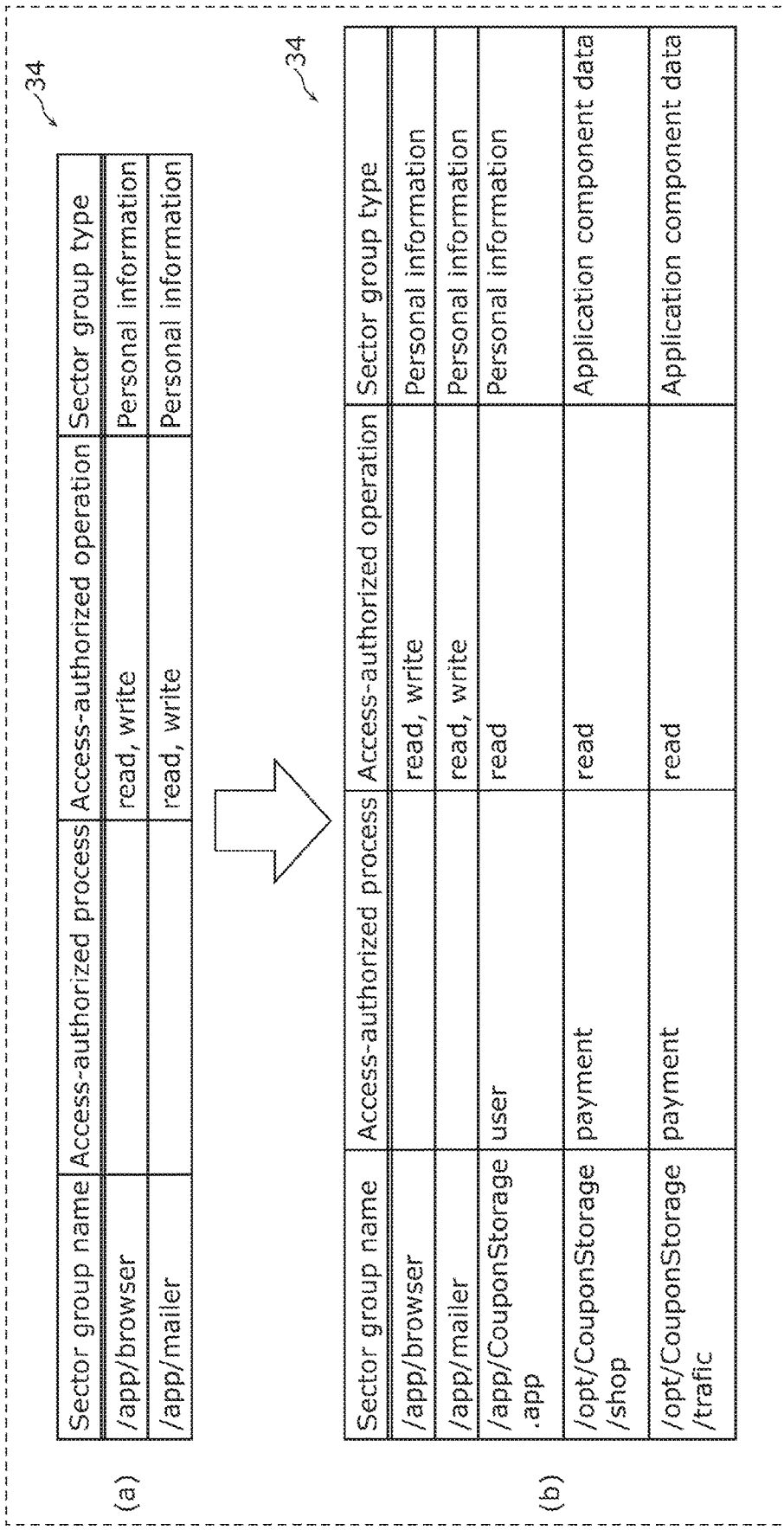
FIG. 19 illustrates an example of before and after updating of a sector-group access rule database when the guest OS adds the application.
Figure 20:
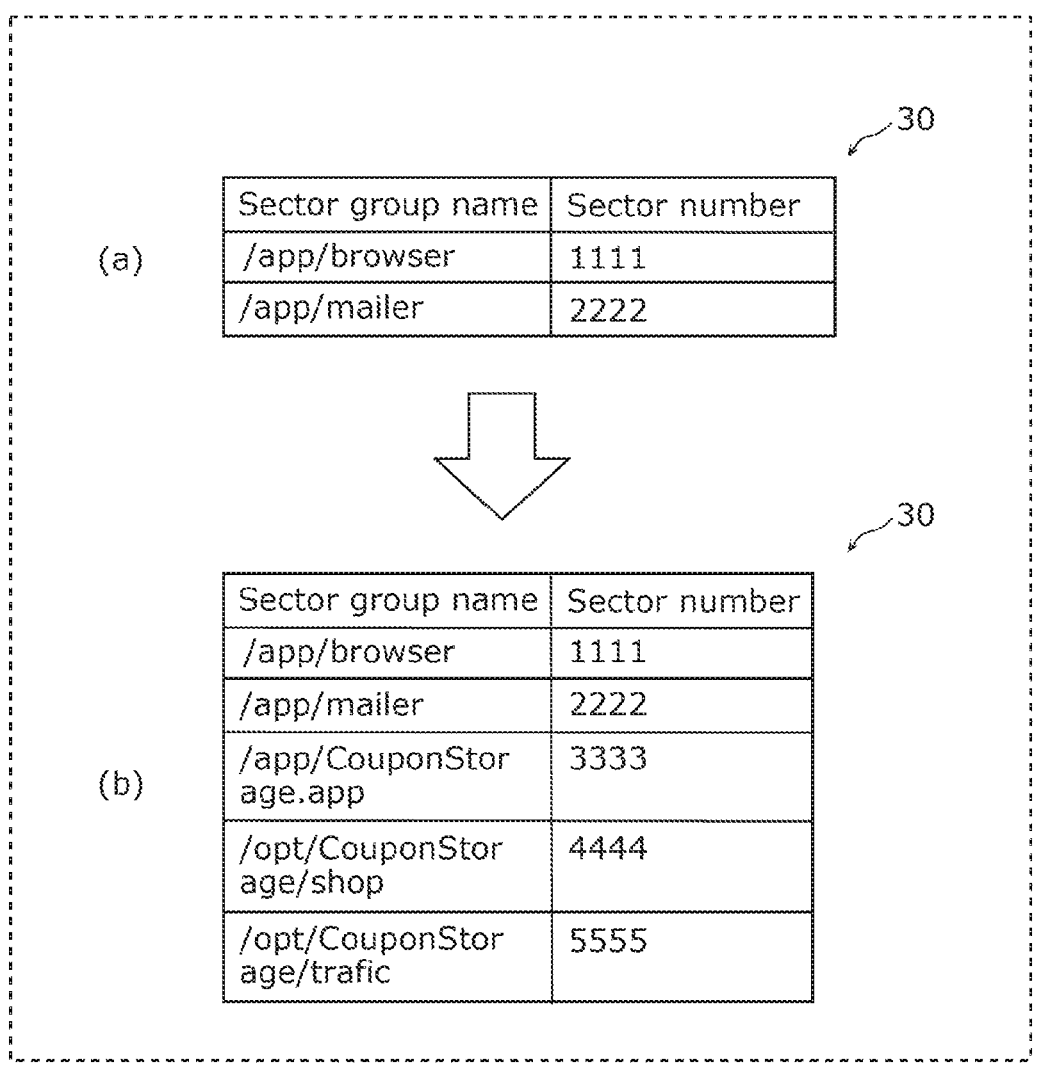
FIG. 20 illustrates an example of before and after updating of the sector-group database when the guest OS adds the application.

Next, the process performed in Step S603 of the flowchart in FIG. 16 when change type determiner 46 determines that guest OS 8 adds application 15 is described in detail with reference to FIG. 18 to FIG. 20. FIG. 18 is a flowchart illustrating in detail the process performed in Step S603 of the flowchart in FIG. 16 when guest OS 8 adds application 15. FIG. 19 illustrates an example of before and after updating of sector-group access rule database 34 when guest OS 8 adds application 15. FIG. 20 illustrates an example of before and after updating of sector-group database 30 when guest OS 8 adds application 15.

As illustrated in FIG. 18, based on the result of the determination made by change type determiner 46 (the result of the determination that guest OS 8 adds application 15), obtainer 48 of manager 42 obtains developer definition policy 15a of application 15 from the application storage area of guest OS 8 via virtualization control system 6 (S801). Obtainer 48 outputs developer definition policy 15a obtained, to updater 50.

Based on developer definition policy 15a from obtainer 48, updater 50 of manager 42 adds a rule related to application 15 added (for example, "Coupon Storage") to sector-group access rule database 34 illustrated in (a) of FIG. 19 (S802). As a result, sector-group access rule database 34 is updated as illustrated in (b) of FIG. 19 for example.

Furthermore, updater 50 adds the sector group name and the sector number related to application 15 added, to sector-group database 30 illustrated in (a) of FIG. 20 (S803). As a result, sector-group database 30 is updated as illustrated in (b) of FIG. 20.

Figure 21:
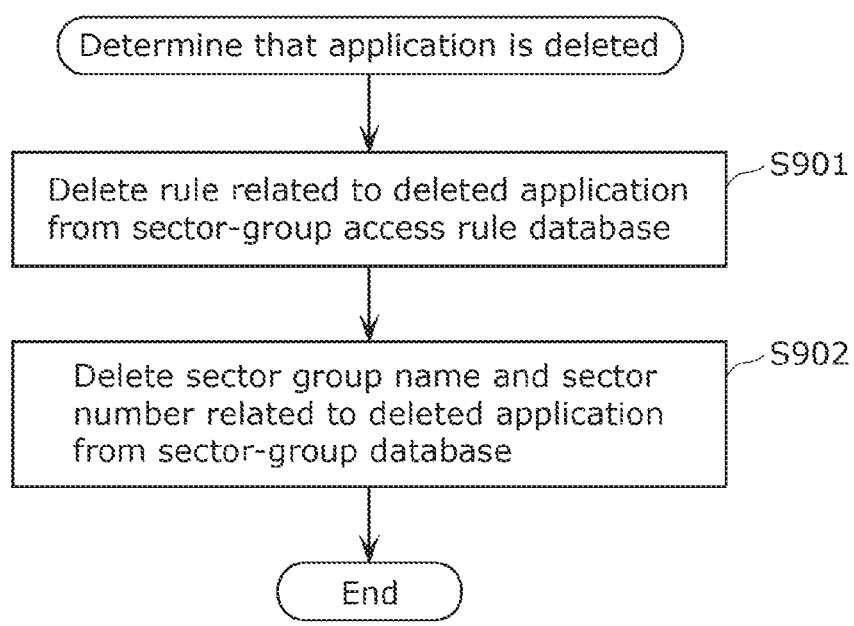
FIG. 21 is a flowchart in detail illustrating a process performed in Step S603 of the flowchart in FIG. 16 when the guest OS deletes an application.
Figure 22:
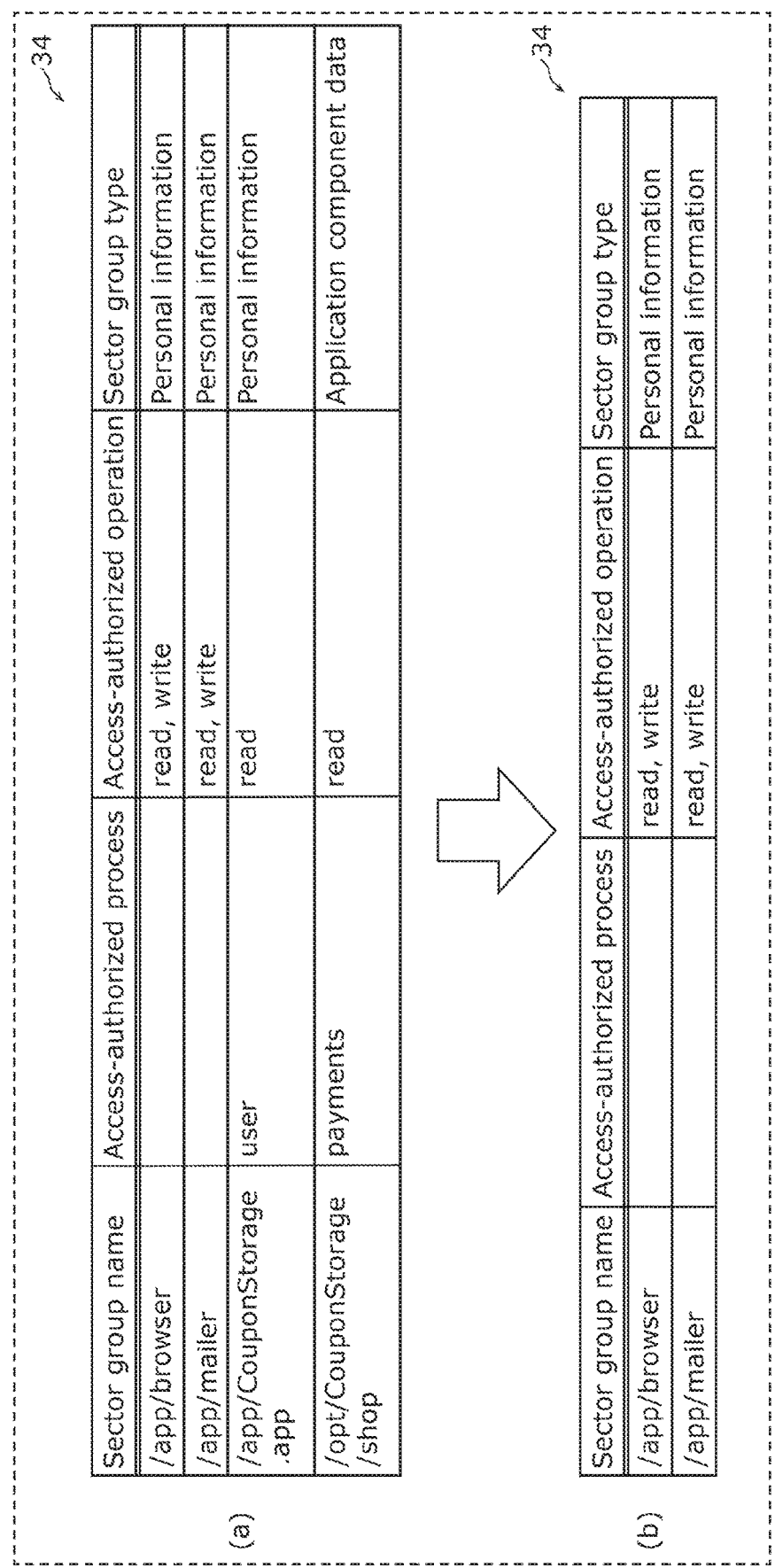
FIG. 22 illustrates an example of before and after updating of the sector-group access rule database when the guest OS deletes the application.
Figure 23:
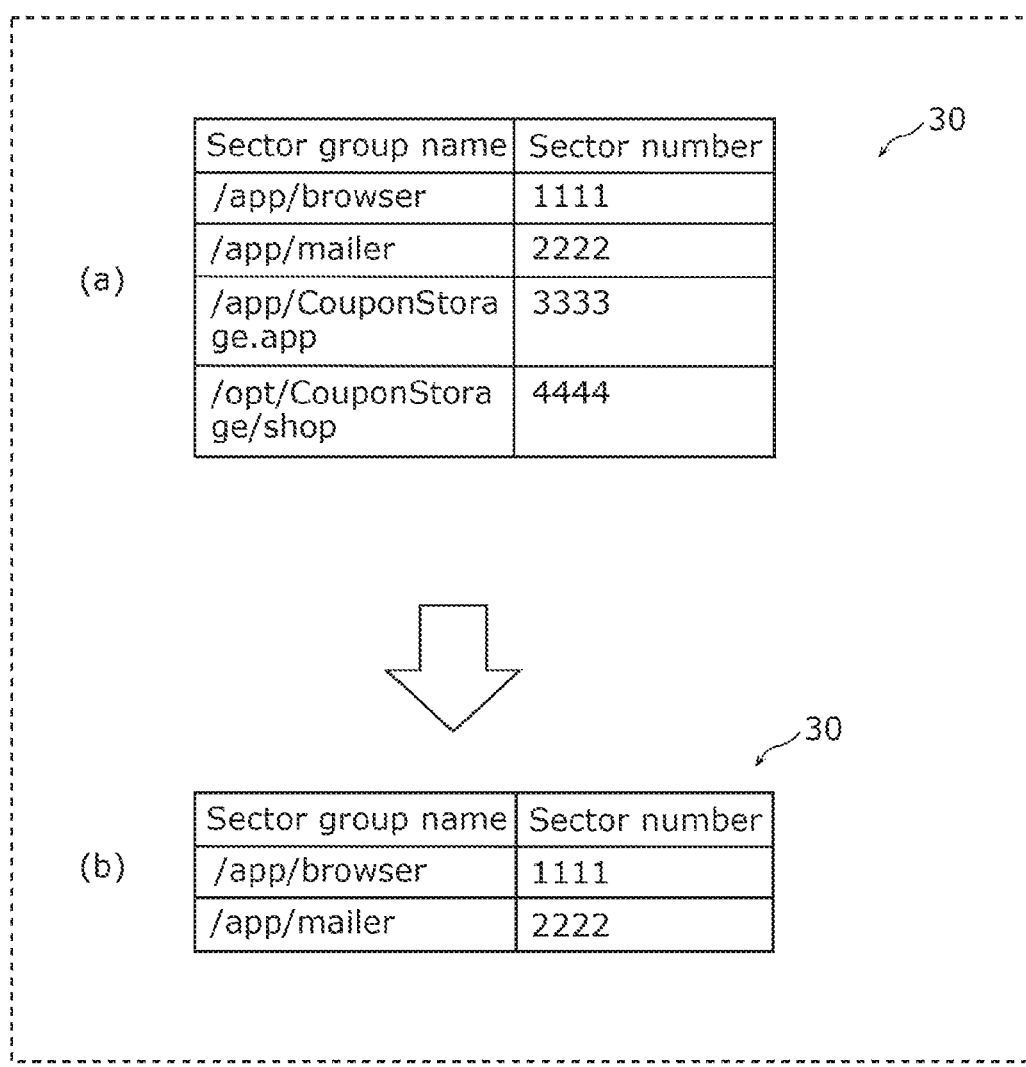
FIG. 23 illustrates an example of before and after updating of the sector-group database when the guest OS deletes the application.

Next, the process performed in Step S603 of the flowchart in FIG. 16 when change type determiner 46 determines that guest OS 8 deletes application 15 is described in detail with reference to FIG. 21 to FIG. 23. FIG. 21 is a flowchart illustrating in detail the process performed in Step S603 of the flowchart in FIG. 16 when guest OS 8 deletes application 15. FIG. 22 illustrates an example of before and after updating of sector-group access rule database 34 when guest OS 8 deletes application 15. FIG. 23 illustrates an example of before and after updating of sector-group database 30 when guest OS 8 deletes application 15.

As illustrated in FIG. 21, based on the result of the determination made by change type determiner 46 (the result of the determination that guest OS 8 deletes application 15), updater 50 of manager 42 deletes the rule related to application 15 deleted (for example, "Coupon Storage"), from sector-group access rule database 34 illustrated in (a) of FIG. 22. As a result, sector-group access rule database 34 is updated as illustrated in (b) of FIG. 22.

Furthermore, updater 50 deletes the sector group name and the sector number related to application 15 deleted, from sector-group database 30 illustrated in (a) of FIG. 23. As a result, sector-group database 30 is updated as illustrated in (b) of FIG. 23.

Figure 24:
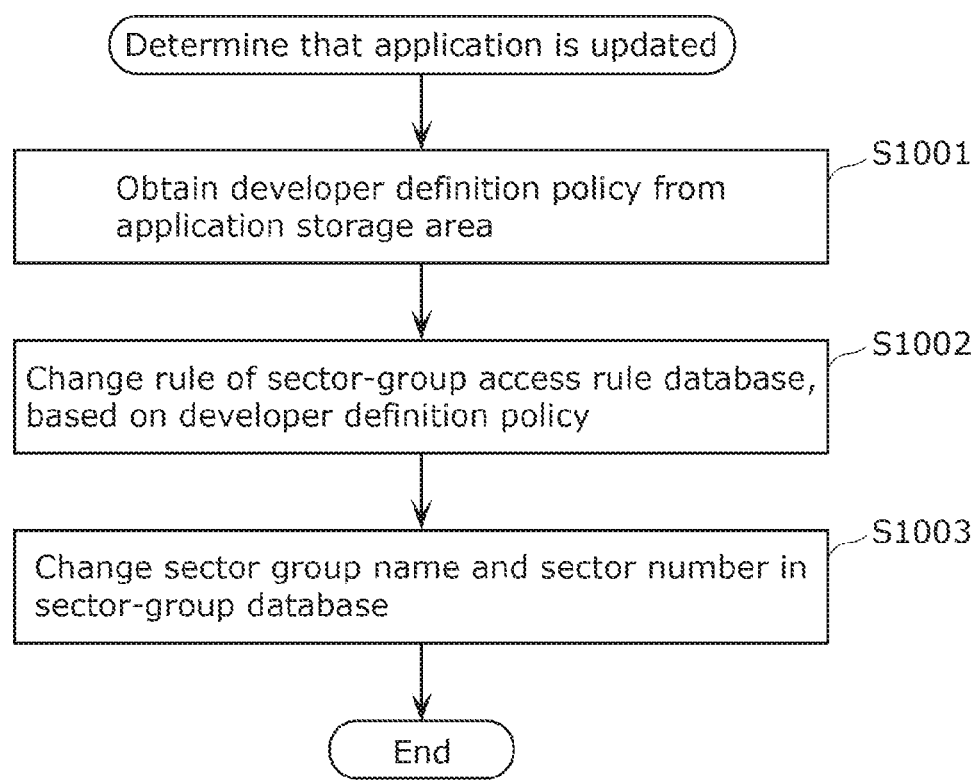
FIG. 24 is a flowchart illustrating in detail a process performed in Step S603 of the flowchart in FIG. 16 when the guest OS updates an application.
Figure 26:
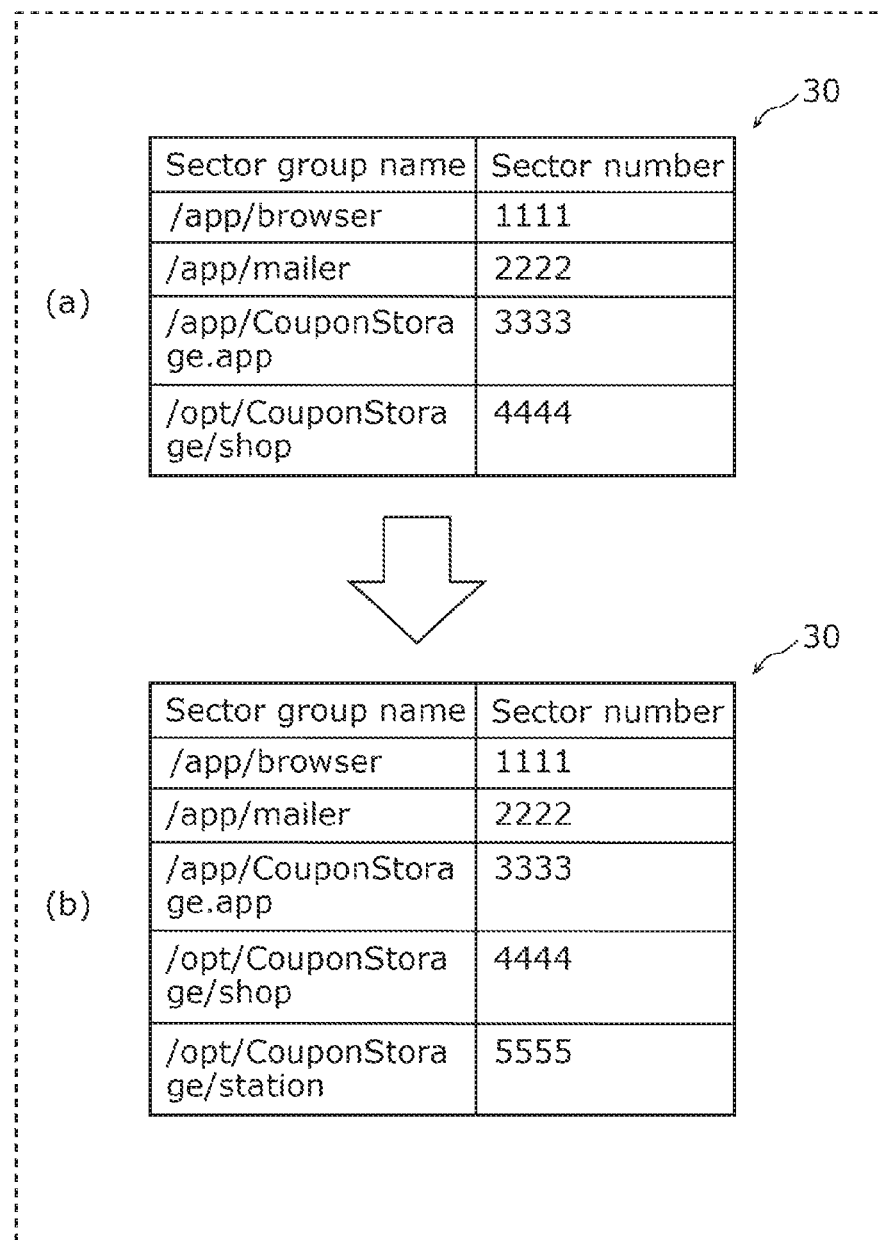
FIG. 26 illustrates an example of before and after updating of the sector-group database when the guest OS updates the application.

Next, the process performed in Step S603 of the flowchart in FIG. 16 when change type determiner 46 determines that guest OS 8 updates application 15 is described in detail with reference to FIG. 24 to FIG. 26. FIG. 24 is a flowchart illustrating in detail the process performed in Step S603 of the flowchart in FIG. 16 when guest OS 8 updates application 15. FIG. 25 illustrates an example of before and after updating of sector-group access rule database 34 when guest OS 8 updates application 15. FIG. 26 illustrates an example of before and after updating of sector-group database 30 when guest OS 8 updates application 15.

As illustrated in FIG. 24, based on the result of the determination made by change type determiner 46 (the result of the determination that guest OS 8 updates application 15), obtainer 48 of manager 42 obtains developer definition policy 15a of application from the application storage area of guest OS 8 via virtualization control system 6 (S1001). Obtainer 48 outputs developer definition policy 15a obtained, to updater 50.

Based on developer definition policy 15a from obtainer 48, updater 50 of manager 42 changes the rule related to application 15 updated (for example, "Coupon Storage") in sector-group access rule database 34 (S1002). To be more specific, after deleting the rule related to application 15, which has yet to be updated, from sector-group access rule database 34 illustrated in (a) of FIG. 25, updater 50 adds a rule related to application 15 updated, to sector-group access rule database 34. As a result, sector-group access rule database 34 is updated as illustrated in (b) of FIG. 25 for example.

Furthermore, updater 50 changes the sector group name and the sector number related to application 15 updated, in sector-group database 30 (S1003). To be more specific, after deleting the sector group name and the sector number related to application 15, which has yet to be updated, from sector-group database 30 illustrated in (a) of FIG. 26, updater 50 adds a sector group name and a sector number related to application 15 updated. As a result, sector-group database 30 is updated as illustrated in (b) of FIG. 26 for example.

3. Advantageous Effects

As described thus far, sector-group database 30 and sector-group access rule database 34 are updated in response to one of addition, deletion, and updating of application 15 made by guest OS 8 in the present embodiment. Thus, even if an unauthorized computer program disables or tampers with access control function 16 of guest OS 8, the validity of the access request from guest OS 8 can be accurately determined based on sector-group database 30 updated and sector-group access rule database 34 updated.

(Other Variations)

Although the information processing device and the control method of the information processing device according to one or more aspects have been described above based on the foregoing exemplary embodiments, the present disclosure is not limited to the foregoing embodiments. Forms realized through various modifications to the embodiment conceived by a person of ordinary skill in the art and forms realized through a combination of structural components in different embodiments, so long as they do not depart from the essence of the present disclosure, may be included in the scope of the one or more aspects.

Moreover, in the above embodiments, each of the structural components may be implemented as dedicated hardware or may be realized by executing a computer program suited to such structural component. Alternatively, each of the structural components may be implemented by a program executor such as a CPU or a processor reading out and executing the computer program recorded on a recording medium such as a hard disk or a semiconductor memory.

Moreover, although the (Type-1) hypervisor is adopted as virtualization control system 6 in the embodiment described above, this is not intended to be limiting. A (Type-2) application including a hypervisor running on an operating system may be adopted.

Furthermore, although virtualization control system 6 and host OS 10 are separate in the embodiment described above, this is not intended to be limiting. Virtualization control system 6 may include the function of host OS 10. In this case, the control system includes virtualization control system 6 including the function of host OS 10.

Furthermore, some or all of the functions of the information processing device according to the above embodiments may be realized by a processor, such as a CPU, executing a computer program.

Some or all of the structural components included in each of the devices described above may be implemented as an IC card or a standalone module that can be inserted into and removed from the corresponding device. The IC card or the module is a computer system configured with a microprocessor, a ROM, a RAM, and so on. The IC card or the module may include a super multifunctional LSI. The microprocessor operates according to the computer program, so that a function of the IC card or the module is achieved. The IC card or the module may be tamper-resistant.

The present disclosure may be the methods described above. Each of the methods may be a computer program causing a computer to execute the steps included in the method. Moreover, the present disclosure may be a digital signal including the computer program. Moreover, the present disclosure may be the aforementioned computer program or digital signal recorded on a non-transitory computer-readable recording medium, such as a flexible disk, a hard disk, a CD-ROM, an MO, a DVD, a DVD-ROM, a DVD-RAM, a Blu-ray (registered trademark) disc (BD), or a semiconductor memory. The present disclosure may also be the digital signal recorded on such recording media. Furthermore, the present disclosure may be the aforementioned computer program or digital signal transmitted via a telecommunication line, a wireless or wired communication line, a network represented by the Internet, and data broadcasting. Moreover, the present disclosure may be a computer system including a microprocessor and a memory. The memory may store the aforementioned computer program and the microprocessor may operate according to the computer program. Furthermore, by transferring the recording medium having the aforementioned computer program or digital signal recorded thereon or by transferring the aforementioned computer program or digital signal via the aforementioned network or the like, the present disclosure may be implemented by a different independent computer system.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following patent application including specification, drawings, and claims is incorporated herein by reference in its entirety: Japanese Patent Application No. 2022-051601 filed on Mar. 28, 2022.

INDUSTRIAL APPLICABILITY

The information processing device according to the present disclosure is applicable to a virtual ECU that has a function of detecting an abnormality in VM-to-VM communication, for example.

The invention claimed is:

1. An information processing device comprising:
an operating system that includes an application storage area for storing an application, and executes the application; and
a control system that accesses a sector group stored in a storage device, in response to an access request from the operating system, wherein the control system includes:
a processor; and
a memory including at least one set of instructions, which when executed by the processor, causes the processor to operate as:
an analyzer that, by reference to correspondence information indicating a correspondence between a sector number and a sector group identifier of the sector group stored in a storage area corresponding to the sector number in the storage device, generates access data from the access request by associating the sector number included in the access request with the sector group identifier;
a monitor that determines whether the access request is unauthorized, based on the access data and rule information indicating a rule for accessing the sector group stored in the storage device;
a determiner that determines, based on the access data, whether the access request seeks to access the sector group related to the application stored in the storage device;
a manager that, if it is determined that the access request seeks to access the sector group related to the application and the operating system makes a change to the application storage area, obtains application information related to the application and updates, based on the application information obtained, the rule information and the correspondence information; and
a control responder that controls a response, based on the result of the determination made by the determiner, wherein:
if the monitor determines that the access request is not unauthorized, the control responder issues an instruction to access the sector group stored in the storage device in response to the access request,
if the monitor determines that the access request is unauthorized, the control responder determines a type of the sector group that is a target for the access request,
if it is determined that the access request does not seek to access the sector group related to the application, the control responder provides an error notification to an external server, and
if it is determined that the access request seeks to access the sector group related to the application and the operating system does not make a change to the application storage area, the manager does not obtain application information related to the application and does not updates, based on the application information obtained, the rule information and the correspondence information.

2. The information processing device according to claim 1,
wherein the change made to the application storage area is one of addition, deletion, and updating of the application.

3. The information processing device according to claim 2,
wherein the manager includes an application database related to the application stored in the application storage area, and determines, by comparison between the application storage area and the application database, whether the operating system makes one of the addition, the deletion, and the updating of the application, if it is determined that the access request seeks to access the sector group related to the application.

4. The information processing device according to claim 2,
wherein if the operating system makes the addition of the application, the manager adds:
the rule related to the application added, to the rule information; and the correspondence related to the application added, to the correspondence information.

5. The information processing device according to claim 2,
wherein if the operating system makes the deletion of the application, the manager deletes:
the rule related to the application deleted, from the rule information; and
the correspondence related to the application deleted, from the correspondence information.

6. The information processing device according to claim 2,
wherein if the operating system makes the updating of the application, the manager changes:
the rule related to the application updated, in the rule information; and
the correspondence related to the application updated, in the correspondence information.

7. The information processing device according to claim 1,
wherein the manager updates the rule information and the correspondence information, based on, as the application information, one of a developer definition policy that defines a condition for protecting the application and a protection rule that is set to protect the application.

8. A control method performed by an information processing device that includes: an operating system that includes an application storage area for storing an application and executes the application; and a control system that accesses a sector group stored in a storage device, in response to an access request from the operating system, the control method comprising:
generating, by reference to correspondence information indicating a correspondence between a sector number and a sector group identifier of the sector group stored in a storage area corresponding to the sector number in the storage device, access data from the access request by associating the sector number included in the access request with the sector group identifier;
determining whether the access request is unauthorized, based on the access data and rule information indicating a rule for accessing the sector group stored in the storage device;
determining, based on the access data, whether the access request seeks to access the sector group related to the application stored in the storage device;
obtaining, if it is determined that the access request seeks to access the sector group related to the application and the operating system makes a change to the application storage area, application information related to the application and updating, based on the application information obtained, the rule information and the correspondence information; and
controlling a response, based on the result of the determination made by the determining whether the access request seeks to access the sector group related to the application stored in the storage device, wherein:
if it is determined that the access request is not unauthorized, the controlling of the response issues an instruction to access the sector group stored in the storage device in response to the access request,
if it is determined that the access request is unauthorized, the controlling of the response determines a type of the sector group that is a target for the access request,
if it is determined that the access request does not seek to access the sector group related to the application, the controlling of the response provides an error notification to an external server, and
if it is determined that the access request seeks to access the sector group related to the application and the operating system does not make a change to the application storage area, the obtaining does not obtain application information related to the application and does not update, based on the application information obtained, the rule information and the correspondence information.

* * * * *